United States Patent
Blom et al.

(10) Patent No.: US 11,835,994 B2
(45) Date of Patent: Dec. 5, 2023

(54) PUBLISHING TO A DATA WAREHOUSE

(71) Applicant: Ab Initio Technology LLC, Lexington, MA (US)

(72) Inventors: Andrew Blom, Lexington, MA (US); Darren Miller, Lexington, MA (US); Marshall A. Isman, Newton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 531 days.

(21) Appl. No.: 16/517,320

(22) Filed: Jul. 19, 2019

(65) Prior Publication Data
US 2020/0026711 A1    Jan. 23, 2020

Related U.S. Application Data

(60) Provisional application No. 62/700,684, filed on Jul. 19, 2018.

(51) Int. Cl.
*G06F 7/00*    (2006.01)
*G06F 17/00*    (2019.01)
(Continued)

(52) U.S. Cl.
CPC ............. *G06F 16/254* (2019.01); *G06F 8/34* (2013.01); *G06F 16/258* (2019.01); *G06F 16/9024* (2019.01); *H04L 67/565* (2022.05)

(58) Field of Classification Search
None
See application file for complete search history.

(56) References Cited

U.S. PATENT DOCUMENTS

| 5,966,072 A | 10/1999 | Stanfill et al. |
| 7,716,630 B2 | 5/2010 | Wholey et al. |

(Continued)

FOREIGN PATENT DOCUMENTS

| EP | 2958016 | 12/2015 |
| JP | H 6-290100 | 10/1994 |

(Continued)

OTHER PUBLICATIONS

U.S. Appl. No. 15/997,278, filed Jun. 4, 2018, Epstein et al.
(Continued)

*Primary Examiner* — Tuan A Pham
(74) *Attorney, Agent, or Firm* — Fish & Richardson P.C.

(57) ABSTRACT

A method for generating an executable application to transform and load data into a structured dataset includes receiving a metadata file that specifies values for parameters for structuring data feeds, received from a networked data source, into a structured database. The metadata file specifies logical rules for transforming the data feeds. The values of the parameters and the logical rules for transforming the plurality of the data feeds are validated to ensure logical consistency for each data feed. Data rules are generated that specify standards for transforming each data feed in accordance with the validated values of the parameters and logical rules. The executable application is generated that is configured to receive source data comprising a data feed from one or more data sources and transform the source data into structured data that satisfies the one or more standards for the structured data record in compliance with the data rules.

34 Claims, 10 Drawing Sheets

(51) Int. Cl.
  *G06F 16/25* (2019.01)
  *G06F 16/901* (2019.01)
  *G06F 8/34* (2018.01)
  *H04L 67/565* (2022.01)

(56) References Cited

U.S. PATENT DOCUMENTS

| | | | | |
|---|---|---|---|---|
| 8,868,580 | B2* | 10/2014 | Gould | G06F 16/24554 707/758 |
| 9,002,770 | B2 | 4/2015 | Gould | |
| 11,003,429 | B1* | 5/2021 | Zejda | G06F 16/9024 |
| 2002/0120919 | A1 | 8/2002 | Aizenbud-Reshef | |
| 2006/0235714 | A1* | 10/2006 | Adinolfi | G06Q 40/06 705/1.1 |
| 2011/0145748 | A1 | 6/2011 | Farver et al. | |
| 2013/0318062 | A1 | 11/2013 | Studer et al. | |
| 2013/0346982 | A1 | 12/2013 | Kalai et al. | |
| 2016/0125057 | A1 | 5/2016 | Gould et al. | |
| 2017/0006135 | A1* | 1/2017 | Siebel | G06F 16/288 |
| 2019/0138524 | A1* | 5/2019 | Singh | G06F 16/24568 |
| 2019/0205309 | A1* | 7/2019 | Gadre | G06F 16/254 |
| 2019/0287017 | A1* | 9/2019 | Esmaeilzadeh, V | G06F 16/24569 |
| 2019/0294613 | A1* | 9/2019 | Sullivan | G06F 16/2455 |

FOREIGN PATENT DOCUMENTS

| | | |
|---|---|---|
| JP | H 7-175791 | 7/1995 |
| JP | 2000-298583 | 10/2000 |
| JP | 2010-524134 | 7/2010 |
| JP | 2017-041029 | 2/2017 |

OTHER PUBLICATIONS

PCT International Search Report and Written Opinion in International Appln. No. PCT/US2019/042669, dated Sep. 18, 2019, 16 pages.
Professional Microsoft SQL Server 2014 Integration Services, Wrox, Apr. 3, 2014, Chapters 1-6, 218 pages.
PCT International Preliminary Report on Patentability in International Appln. No. PCT/US2019/042669, dated Jan. 19, 2021, 9 pages.
Office Action in European Appln. No. 19713959.5, dated Oct. 29, 2012, 5 pages.
Office Action in Indian Appln. No. 202127003179, dated Oct. 19, 2022, 6 pages.
Office Action in Japanese Appln. No. 2020-572555, dated Jun. 30, 2023, 23 pages (with English translation).
Office Action in Australian Appln. No. 2019307745, dated Sep. 28, 2023, 4 pages.

* cited by examiner

PUBLISHING TO A DATA WAREHOUSE

CLAIM OF PRIORITY

This application claims priority under 35 U.S.C. § 119(e) to U.S. Patent application Ser. No. 62/700,684, filed on Jul. 19, 2018, the entire contents of which are hereby incorporated by reference.

TECHNICAL FIELD

This application describes systems and methods for generating, updating, and maintaining software to transform and load data into data warehouses.

BACKGROUND

A data warehouse includes a system for housing data, typically from a number of disparate sources. For example, a data warehouse may store data received from multiple sources, and some of the sources may be of a different type than other sources.

SUMMARY

Before being stored in a data warehouse, data are preprocessed in order to conform to the standards of the data warehouse. The data may have key values which identify its records; these can be checked for referential integrity, or replaced with surrogate key values that are not inconsistent within the system of references in the target data warehouse. The data can be transformed in order to represent the history of changes to the data according to conventional historization schemes. The data can be decorated with additional information related to such attributes as its time of loading, time of modification, or current status. The data can be merged with existing records in the data warehouse to update information, supply missing information, and correct errors. The data can be loaded to target tables and auxiliary historical tables. Code to accomplish these preprocessing tasks is generated, updated, and maintained by a compiler which receives a metadata file specifying logical rules and values for parameters, the rules and parameters being given by the target data warehouse and specifying the actions to be executed at runtime to transform the incoming data such that this data is structured in a way that, e.g., the structured data maintains data integrity and/or read-optimization in the warehouse where this structured data is to be stored.

In an aspect, a process is described for automatically generating an application to transform and load data into a structured dataset for storing data from one or more networked data sources. The process includes receiving at least one metadata file that specifies values for parameters and logical rules for transforming data feeds, where each data feed is to be received from a networked data source, and loading the results into a structured dataset. The process includes validating that the values of the parameters and the logical rules for transforming the plurality of the data feeds are not inconsistent for each data feed; generating data rules that specify one or more standards in accordance with the validated values of the parameters and the validated logical rules for transforming each data feed of the data feeds into a structured data record. The process includes generating at least one data processing application for a runtime environment. The data processing application that is generated is configurable to receive source data including a data feed from one or more data sources and transform the source data into structured data that satisfies the one or more standards for the structured data record in compliance with the generated data rules.

In some implementations, the data processing application comprises a dataflow graph, a dataflow subgraph, or a plurality of dataflow graphs. In some implementations, the structured dataset comprises a database.

Generally, the source data comprises a data record, and a parameter of the metadata file specifies a field of the data record that represents a key value for the data record of the source data. In some implementations, a parameter of the metadata file specifies a mapping between the field that represents the key value of the source data and another field of the structured data record that represents another key value of the structured data record. A parameter of the metadata file specifies a format of the key value, and where the key value is transformed to have the format specified by the parameter.

In some implementations, the process includes retrieving a default value for a parameter from a data storage and defining the data rules based on the default value of the parameter. Generally, a logical rule specifies a format for a field of the structured data record, the field including a data history value. In an aspect, the data history value includes a time stamp indicative of when the structured data record including the data history value is updated.

In some implementations, receiving the metadata file includes parsing a header row the metadata file to determine which parameters have specified values in the metadata file.

In some implementations, transforming the source data into structured data that satisfies the one or more standards for the structured data record as defined by the data rules includes determining that at least two different portions of the source data specify identical key values and specifying a new key value for at least one of the two different portions of the source data, the new key value being different from the identical key values and based on a key sequence of the structured data record.

In some implementations, the process includes retrieving one or more default values for one or more additional parameters that are not specified by the at least one metadata file, where defining the data rules is based on the default values of the one or more additional parameters. Generally, the metadata file includes one or more semantic rules that specify an interpretation of data for the structured data record.

In some implementations, the parameters of the metadata file comprise a data quality parameter that specifies acceptable data values for including in the structured data record. In some implementations, the parameters of the metadata file comprise a data integrity parameter that specifies a key mapping scheme for the structured data record. In some implementations, the parameters of the metadata file comprise a data reporting parameter that specifies whether the structured data record of the structured dataset is configured to be read-optimized or write-optimized.

In an aspect, validating that the values of the parameters and the logical rules for transforming the plurality of the data feeds are logically not inconsistent for each data feed comprises performing a check on feed-specific metadata specifying a key surrogation rule and load-specific metadata specifying a data historization rule.

In some implementations, the data processing application is further configured to load the structured data into the structured dataset. The actions include generating a plurality of data processing applications including the at least one dataflow graph, where the plurality of dataflow graphs form an executable application.

Other features and advantages of the invention will become apparent from the following description, and from the claims.

DETAILED DESCRIPTION

This document describes systems and methods for generating, updating, and maintaining executable code to transform and load data into data warehouses. A data warehouse is a data storage facility that stores structured data in structured data records according to a pre-defined standard (e.g., format, historization scheme, etc.). A metadata-driven warehouse (MDW) system includes a compiler, which uses logical rules and parameters, including metadata expressing the pre-defined standards of data storage in the data warehouse, to generate data processing computer programs (e.g. components of the executable dataflow graphs and associated files constituting a metadata-driven warehouse application) for use at runtime. These programs prepare data from other computing systems for storage in the data warehouse. An executable dataflow graph is a type of computer program that processes data using components (which in turn contain or represent executable code that carries out data processing functions) included in the dataflow graph. In this description, a dataflow graph is described as performing actions when the components the dataflow graph represents are configured to perform those actions. The components can include data sources to read input data, data sinks to output or store data processed by the graph, and data processing components processing the input data. Compiling a dataflow graph comprises generating the logical components that execute code and which can be represented in a dataflow graph. The configuration of the components determines how the data are processed. The one or more executable dataflow graphs in turn form an executable metadata warehouse application. The metadata warehouse application is executed in a runtime environment on a runtime system. The runtime system is configured to receive data from one or more data sources and structure the received data for storage in a data warehouse.

Overall, the metadata-driven warehouse system generates executable dataflow graphs based on logical rules and parameters, including warehouse metadata, provided to the compiler. The parameters define the manner in which a particular executable dataflow graph processes data. The dataflow graph is executed by a runtime application to prepare data for storage in a data warehouse.

Figure 1A:
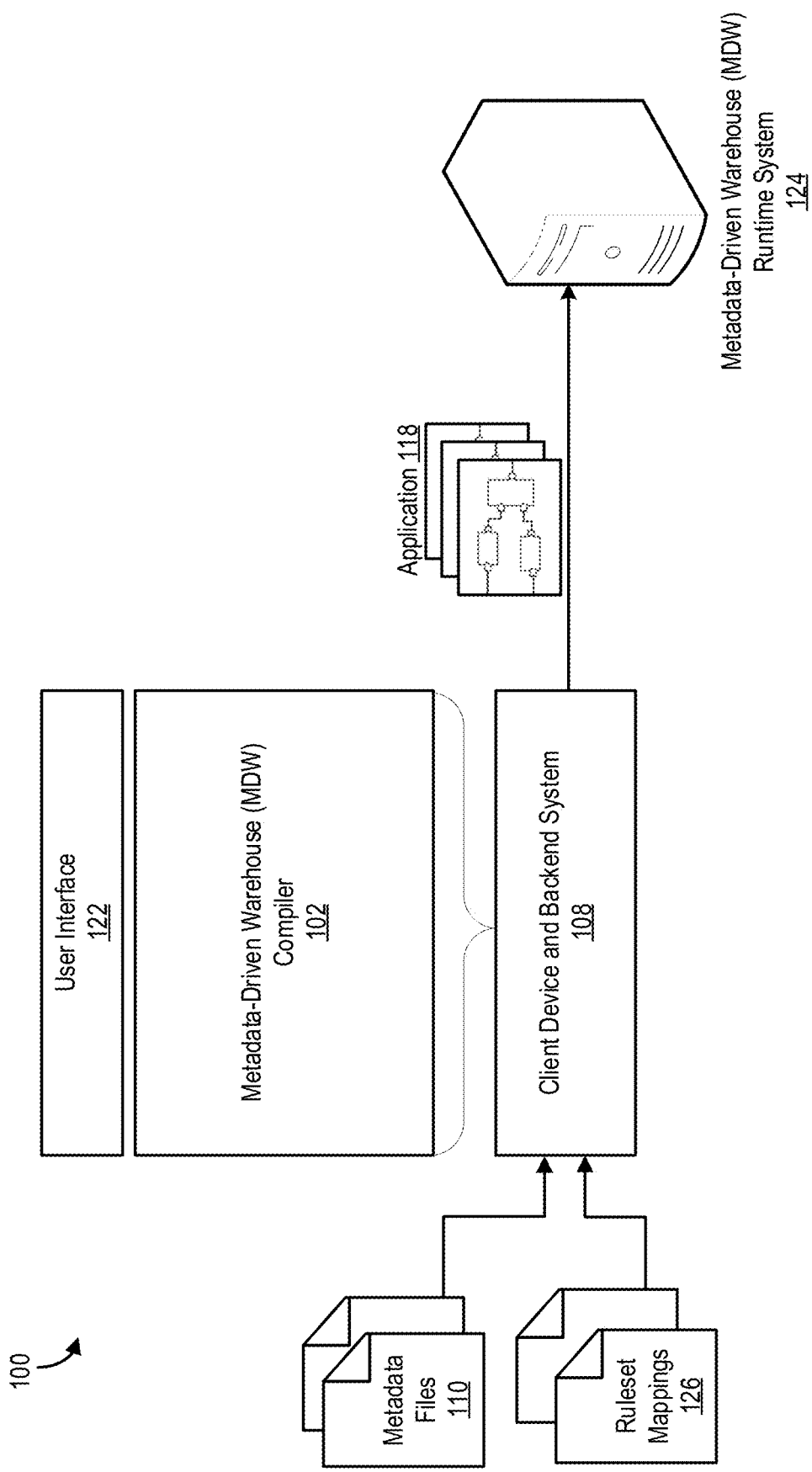
FIG. 1A is a system diagram of a compiling environment for a metadata-driven data warehouse application.

FIG. 1A shows an example compiling environment 100 for generating an executable application configured to transform data for storage in a data warehouse (also called a metadata-driven warehouse). The compiling environment 100 includes a metadata-driven warehouse (MDW) compiler 102 for generating (e.g., configuring) an executable application 118 including one or more executable dataflow graphs. The dataflow graph(s) generally form the application 118 that is executable by a runtime system, such as a metadata-driven warehouse (MDW) runtime system 124 of FIG. 1B. More specifically, configuring an executable dataflow graph of the application 118 comprises compiling executable code that, when executed in a runtime environment 120, performs one or more operations specified in the dataflow graph. Once generated by the MDW compiler 102 in the compiling environment, the executable dataflow graphs of the executable application 118 are executed in the runtime environment 120. The application 118 can also include additional files that are used with the dataflow graphs during execution, such as workflow orchestrators (plans), parameter set files, and so forth as subsequently described in relation to FIG. 2A.

Figure 1B:
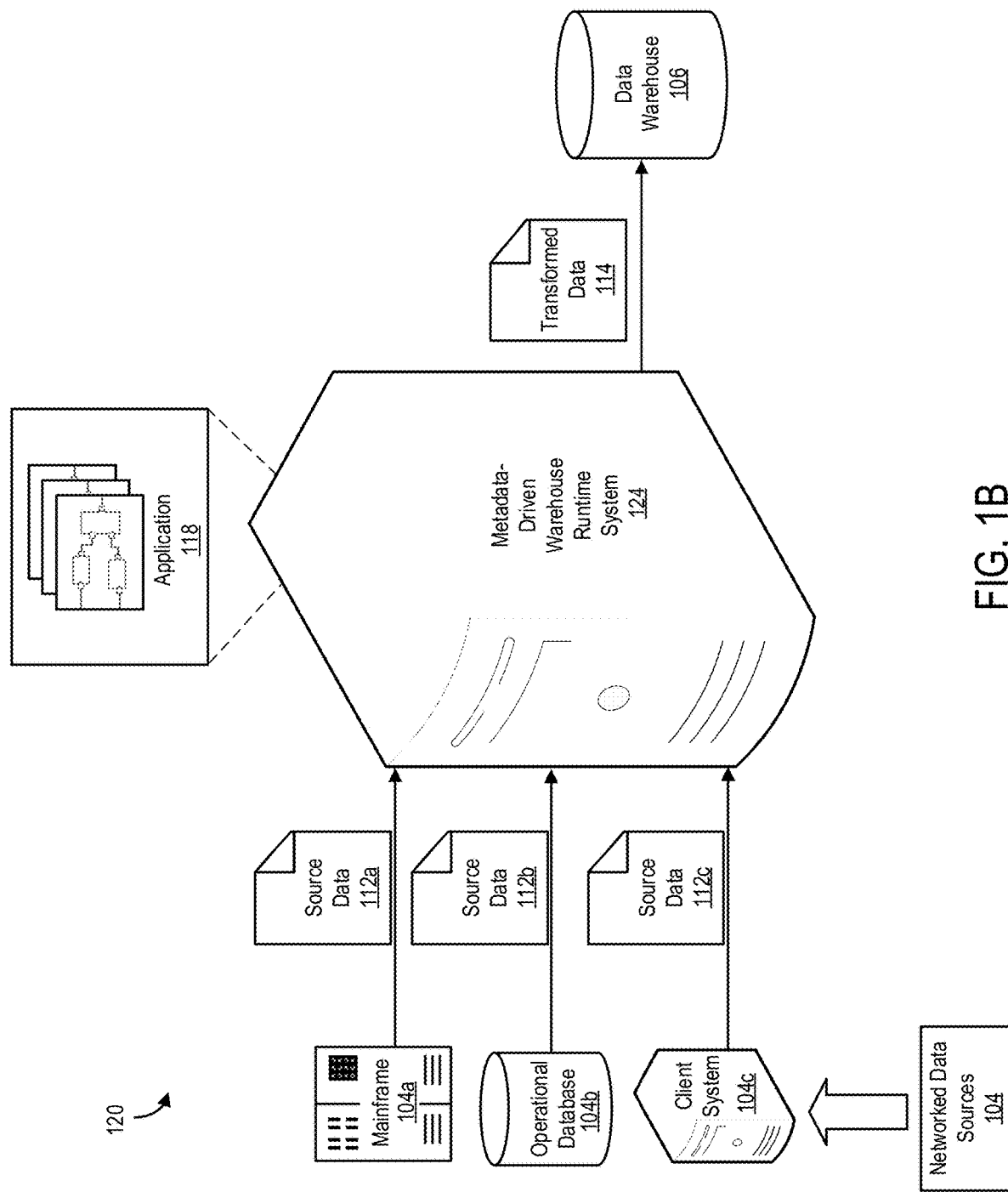
FIG. 1B is a system diagram of a runtime environment for a metadata-driven data warehouse application

In the runtime environment 120, shown in FIG. 1B, the executable application 118 is executed by the MDW runtime system 124. The MDW runtime system 124 is configured to receive source data 112 (e.g., source data 112a, 112b, and 112c) from one or more data sources 104a, 104b, and 104c, respectively, transform the data (by the executable logic of the application 118) into transformed data 114 that complies with data rules (e.g., a pre-defined standard) of a data warehouse 106, and send the transformed data to the data warehouse 106 for storage.

An executable dataflow graph of the application 118 is a computer program executed within a dataflow graph execution environment (e.g., MDW runtime system 124) that processes data from one or more data sources, such as the networked data sources 104. The data from the networked data sources 104 are manipulated and processed (e.g. transformed) according to the dataflow graph and exported to the data warehouse 106. The executable dataflow graphs are represented as directed graphs including nodes representing components, such as data processing components, each including code for processing data from at least one data input or source and providing data to at least one data sink or output, and nodes representing dataset objects for accessing the networked data sources 104 and/or the data warehouse 106. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. The data structures and program code used to implement dataflow graphs can support multiple different configurations by being parameterized to enable different networked data sources 104 (or a different data warehouse) to be substituted readily. Furthermore, in some arrangements, the flow of the dataflow graph may be altered by the use of parameters, such that a component or a series of components may be bypassed. In general, a parameter represents a property of a dataflow graph that can be configured or changed. For example, a property can be changed between uses of the dataflow graph, and the dataflow graph may perform operations differently because of the change. A system for executing dataflow graphs is described in U.S. Pat. No. 5,966,072, titled "EXECUTING COMPUTATIONS EXPRESSED AS GRAPHS," incorporated herein by reference in its entirety.

Figure 3:
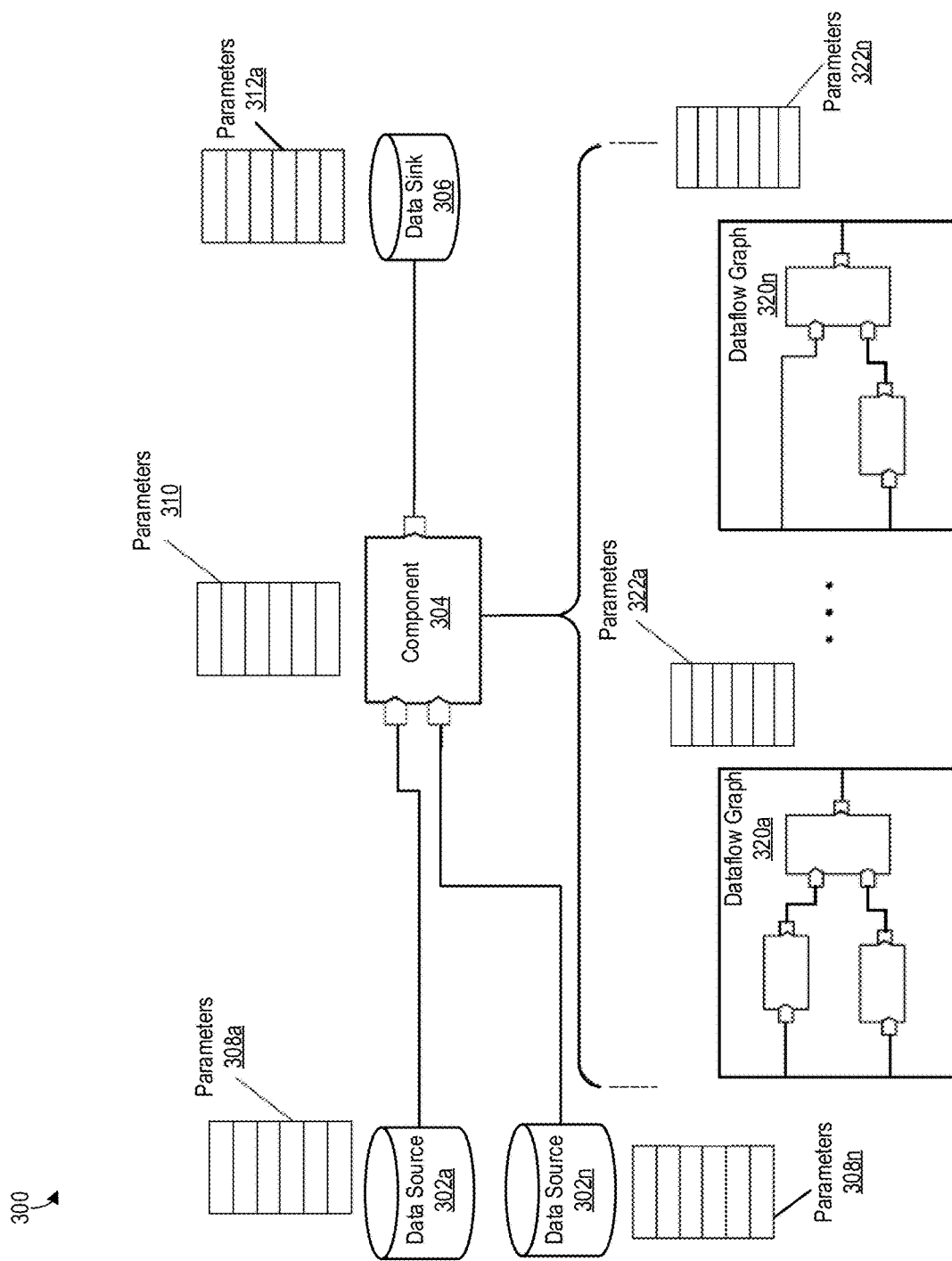
FIG. 3 shows an example dataflow graph including a component.

A dataflow graph can be configured at compile time, by altering the dataflow graph pre-compilation to perform a particular action, or at run-time, by setting parameters or altering configuration files that are used by the dataflow graph. In some implementations, the dataflow graph(s) of the application 118 executed by the MDW runtime system 124 are compiled at the MDW compiler 102 from data (e.g., metadata files 110) received from the client device and backend system 108 (subsequently, client device 108). In some implementations, one or more of the dataflow graph(s) executed by MDW the runtime system 124 are compiled by the client device 108 by the MDW compiler 102, and the data are sent to the MDW runtime system 124 for execution of the dataflow graph(s). In this case, the compiled application 118 can operate on at least a portion of the source data 112. The compiled application 118 can be integrated with one or more other dataflow graph(s) generated and compiled by the data warehouse 106 to cooperatively process the source data 112. A dataflow graph of the application 118 is described in further detail with respect to FIG. 3. An environment for developing and configuring dataflow graphs is described in more detail in U.S. Pat. No. 7,716,630, titled "Managing Parameters for Graph-Based Applications," incorporated herein by reference in its entirety.

The data warehouse 106 includes a repository of transformed source data 112 from the one or more networked data sources 104. The data (e.g., transformed data 114) stored in the data warehouse 106 is configured to comply with data rules of the data warehouse. The data rules of a data warehouse 106 determine how the data warehouse loads, stores, and updates data. Data stored in the data warehouse 106 are in compliance with the data rules. The data rules facilitate one or more applications of the data warehouse 106, such as data reporting, data analysis, data mining, and other similar applications.

The data rules of the data warehouse 106 defines how the data (e.g., the source data 112) is transformed for storage in the data warehouse 106. The data rules are logical rules and can include multiple files in various formats. For example, the data rules can include a first file that specifies data quality rules, and a second file that specifies key handling rules. The files of the data rules include metadata that can define one or more values of parameters for transforming the source data 112. The parameters of the data rules indicate exactly what the configuration of the data warehouse 106 is supposed to be. For example, the data warehouse 106 data rules specifies how to retrieve data from the data warehouse 106 and how to extract, transform, and load data to the data warehouse 106. For example, the data rules of the data warehouse 106 can include a data dictionary. The data dictionary includes metadata that defines how stored data are handled by the data warehouse 106. For example, the data dictionary can specify the meaning of stored data, relationships to other data, origin, usage, and format of stored data.

Generally, the data rules are defined by one or more devices before compiling occurs at the MDW compiler 102. For example, data quality rules that are included in the data rules can be defined in advance and received by the MDW compiler 102 for compiling the dataflow graphs of the application 118. In some aspects, at least portions of the data rules can be defined at the client device 108. For example, the data rules can be defined (e.g., by a user) through an interface associated with an application on the client device 108, and the defined data rules can be sent to the MDW compiler 102. In another example, the data rules are defined at a device other than the client device 108. In yet another example, at least some of the data rules are defined through an interface associated with the MDW compiler 102.

First, the data rules specify standards for data history of the data stored in the data warehouse 106. The data history specifies how data in the data warehouse 106 are maintained according to a particular standard. The standard includes a set of rules for how data are entered into data records of the data warehouse 106. These rules can vary for different data warehouses. Generally, the rules standardize data loading and the updating of records for a particular data warehouse. Data history, sometimes referred to as historization, ensures that the data warehouse 106 correctly records changes (e.g., updates) to data in the data warehouse 106 over time.

The data warehouse 106 can store a record of the contents of the data warehouse 106 at different points (e.g., each point) in time, which enables another system to request a snapshot of the data warehouse 106 contents according to their state at a particular moment in time. The data history can be enabled by a standard technique for logging when data entries of the data warehouse 106 were added and when the added data was the most current version of the data in the data warehouse (e.g., when that data was changed, if applicable).

For example, a data record may include a time stamp (e.g., a date field) indicating when the data record was added to the data warehouse 106. When the data record is updated, a second, new record is generated, and the second record includes an identifier that associates the second record with the first record. The second record includes a timestamp (e.g., a date field) indicating a time when the record was added. The second record includes data indicating that the second record is the most recent version of the data (e.g., currently valid data). The first data record is then updated to include data indicating that the first record is no longer the most recent (e.g., currently valid) data. The first record is updated to instead indicate the time period of when the first record included the most current data. The data history thus maintained by the data warehouse 106 enables reporting of data stored in the data warehouse 106 at different points in time (e.g., slices over time). While the above example of data history is one particular method that can be used in the data warehouse 106, other methods of maintaining data history can be used by the data warehouse 106. The data rules of the data warehouse 106 indicate which convention should be used for data history of the data warehouse.

Second, the data rules include rules that specify standards for data quality of the data warehouse 106. Data quality refers to the reliability of the data being stored in the data warehouse fulfilling one or more requirements of the applications for which the data are being stored. For example, a requirement of an application can include that one or more fields of a data record are populated with data, that the data are up to date, and that data has a particular format. Essentially, the application (which is external to MDW runtime system 124) is able to request data from the data warehouse 106 and reliably receive data in response to the request in an expected format.

The data quality of the data warehouse 106 ensures that data stored in the data warehouse fulfills the requirements of applications that are using (e.g., retrieving and processing) the data stored in the data warehouse 106. Data quality is implemented by a set of data processing steps that ensure a standard of completeness, validity, accuracy, consistency, availability and timeliness of the data being stored.

For example, data quality ensures that each data record is correctly populated with data from the one or more networked data sources 104. When data is ingested by the MDW runtime system 124, the data are checked for completeness, redundancy, formatting, accuracy, and so forth. A data cleansing process may be used, which includes identifying incomplete, incorrect, inaccurate or irrelevant parts of the data and then replacing, modifying, or deleting the identified data. In some implementations, data entries are merged if multiple of the networked data sources 104 refer to the same data (e.g., two sources contain copies of the same data record). The data warehouse 106 data rules specify data quality requirements for the data warehouse, such as what standards the transformed data 114 must meet to be stored in the data warehouse. The MDW runtime system 124 transforms the source data 112 into the transformed data 114 according to the data rules of the data warehouse 106.

Third, the data rules specify how data of the data warehouse 106 meet a standard of data integrity. Data integrity refers to the degree to which data being stored are accurate and consistent over the lifespan of that data. Data integrity includes an ability to access particular data from the data warehouse 106. For example, the data rules specify how data entries are indexed (e.g., what key value(s) are assigned to each record). In another example, the data rules specify how a reference in a first data record is configured to point to a second data record. In another example, data integrity ensures each record has a valid index or key value that can be referenced by other records. Data integrity ensures that, when an application (e.g., external to the MDW runtime system 124) requests data from a data record in the data warehouse 106, the correct data are returned from the data warehouse, excluding other data that was not requested. Correct data can include data from the data record, data record, and/or data field indicated in the query by the application. Mappings specified in the data warehouse 106 among data entries of the data warehouse 106 must be valid in order for an application to reliably access data from the data warehouse 106.

The data integrity of the data warehouse 106 ensures that data stored in the data warehouse 106 are consistent and accurate over the life cycle of that data, and that the expected data are returned in response to a query for the data in the data warehouse. Data integrity ensures that there are no unintended changes to the data as a result of storage, retrieval or a processing operation performed on the data in the data warehouse 106. For example, the data integrity rules can specify that data be loaded to a buffer before being read, changed, etc. Data integrity for the data warehouse 106 ensures that at least one of entity integrity, referential integrity, domain integrity, or some user-defined integrity standard is kept. For example, referential integrity may specify how a first key references a second key in the data warehouse 106. Referential integrity ensures that a reference will point to a valid index (e.g., key value) of the structured data, and that no infinite loops in referential logic occur. In another example, entity integrity may specify what field of the data records stored in the data warehouse contains the primary key for each data record and what key values it will have. For example, the entity integrity data can specify that a first field of the structured data in the data warehouse is the key field, and that this field has hexadecimal key values between greater than 1, each having at least 4 digits. The data rules of the data warehouse 106 define what key mappings are allowed and with which standard the key mappings comply. For example, the key mappings may be able to refer to one different table or record or multiple other tables or records. The list of key mappings can be called a key mapping scheme.

Fourth, the data rules specify how the data warehouse 106 is configured for data reporting. The data stored in the data warehouse 106 are reported in response to a request in a way that does not compromise functionality of the data warehouse 106. The data rules specify how data in the data warehouse 106 are stored so that the data can be read from the data warehouse without impacting performance of the data warehouse. For example, the data in the data warehouse can be write-optimized, such that a read line can is configured to access a single record without impacting access to other records for writing. Such a scheme may slow reading from the database while improving times for writing data to the database. In contrast, the data rules can specify that the structured data be read-optimized. This indicates that a write line access only a single data record at a time, which prevents negatively impacting reading large amounts of data from the database at once. Thus, the data of the data warehouse 106 can be reported to a requesting system without disrupting the functionality of the data warehouse. In some examples, the requesting system is a computing system external to the MDW runtime system 124 that requests data from the data warehouse 106. In some implementations, the data warehouse 106 is read-optimized (e.g., optimized for read operations as opposed to write operations or other types of operations). For example, the data of the data warehouse 106 can include de-normalized data. De-normalizing the data of the data warehouse 106 includes grouping related data (e.g., adding redundant copies of data, in some cases) to reduce reliance on relational tables during read operations (e.g., relative to a normalized database). Each record includes all data needed for the read operation, and join operations (e.g., joining two entries) are not required to read the data. This is a particular example of a read-optimized database, but other methods can be used for read-optimizing the data warehouse 106. In some implementations, the data warehouse 106 is updated during a scheduled period of time in which few or no requests for data from the data warehouse 106 are being made (e.g., overnight). The data rules of the data warehouse 106 reflect the manner in which the data warehouse 106 is read-optimized and constrain the read/write schedule of the data warehouse.

Returning to FIG. 1A, in the compiling environment 100, the MDW compiler 102 is configured to generate the one or more executable dataflow graphs of the executable application 118 that, when executed in the runtime environment 120, prepare data from one or more data sources 104 for storage in the data warehouse 106. The functionality of the application 118 generated by the MDW compiler 102 is defined by metadata parameters in metadata files 110 and logical rules in ruleset mappings 126, which define the data rules for the data warehouse 106 as described above. The particular contents of the ruleset mappings 126 and metadata files 110 are described with respect to FIGS. 2A-2B.

The MDW compiler 102 receives the data rules of the data warehouse 106 in the form of the metadata files 110 and ruleset mappings 126. The metadata files 110 and the ruleset mappings 126 include each of the parameters for how the data warehouse 106 is configured for data history, data quality, data integrity, and data reporting as described above. The MDW compiler 102 is configured to generate, using the parameters of the data rules of the data warehouse 106, the dataflow graphs of the application 118. The application 118 is configured to transform the source data 112 from the networked data sources 104 into transformed data 114 that are loaded into the data warehouse 106.

The metadata files 110 include or represent the data rules for storing data in the data warehouse 106. The metadata of the metadata files 110 includes parameter values that specify the format of the transformed data 114 stored in the data warehouse 106.

For example, the metadata files 110 specify how different key values of a system of operational databases 104b of the networked data sources 104 are combined into a single index. In this example, different operational databases 104b of the system may include redundant key values with respect to one another. The metadata files 110 specify how these redundant key values are transformed into unique key values for a unified index in the data warehouse 106. This operation can include, for example, determining that the operational key value of "001" is not already represented in the data warehouse 106, and thus transforming the key value "001" of an operational database 104b to a new value that is unique for the data warehouse 106.

The number of parameters specified in the metadata file 110 can vary. Generally, the metadata file 110 includes values for every parameter needed to determine the format and handling of the transformed data 114. In some implementations, if one or more parameters do not have specified values, a predetermined default value is substituted for those one or more parameters. A user can modify the metadata file(s) 110 to change the value(s) of parameter(s) as needed to specify a particular handling of the transformed data 114, for example, to specify the conformance of the transformed data 114 to a particular format of the data warehouse 106. In some implementations, the metadata files 110 include comma separated values (CSV) files, spreadsheet files (XLS), or other such files that can be directly edited by a user of the client device 108. In some implementations, a metadata file 110 includes all parameters with default values that can be changed by the user. While the metadata files 110 may include hundreds of parameters, a user may only need to adjust a handful of parameters (e.g., <30) for a particular data warehouse 106 or portion of the data warehouse 106. Parameters that are not edited remain at the default values.

In some implementations, the MDW runtime system 124 checks the metadata files 110 at runtime to validate the metadata files as being complete (e.g., that the MDW compiler 102 can instantiate graphs from the metadata files). For example, a user might edit fewer than 20 parameters, and leave other parameters at default values. In some implementations, the number of editable parameter values is on a scale of several hundred. The default parameter values for various dataflow graphs can be shown in the file the user is editing, or can be retrieved from a library (not shown) associated with the MDW runtime system 124 at runtime without presenting the parameter values to the user. In some implementations, the library is a part of the storage of the MDW runtime system 124. The library stores data representing the default values for each parameter (e.g., from a table). For example, the MDW compiler 102 checks a header row of a .csv file receive to determine which parameters are included in the metadata file 110 and retrieves default values for the remaining parameters from the library. In some implementations, the MDW runtime system 124 attempts to validate the metadata file 110 at runtime (e.g., when instantiating the dataflow graphs). Validation includes determining that the metadata files 110 include the data required to automatically instantiate dataflow graphs for transforming the source data 112. For example, validation includes checking the parameter values provided in the metadata files 110 to ensure that there are no conflicts, missing values, invalid values, etc.

In addition to, or instead of, editable files that are validated at runtime, the metadata files 110 can be generated from a user interface. Different parameter options are presented to a user in a data ingestion interface (not shown), e.g., on the client device 108. The user can select parameters from menus and other controls and insert values for those parameters as desired. The metadata files 110 can be validated by the program in advance of runtime by the MDW compiler 102. For example, the data ingestion interface includes a program that does not permit the user to enter invalid values for parameters, conflicting values, leave values blank (e.g., if the parameter has no default value), and so forth.

The MDW compiler 102 uses the values of the parameters specified in the metadata files 110 to generate the application 118 that transforms the source data 112 into the transformed data 114 for storage in the data warehouse 106. The values of the parameters specify exactly what operations each of the dataflow graphs generated by the MDW compiler 102 perform (e.g., how each graph transforms the source data 112 into transformed data 114). In other words, the parameters of the metadata files are used to instantiate the dataflow graphs.

In addition to the metadata files 110, the MDW compiler 102 uses data from ruleset mappings 126 to compile dataflow graphs. As described previously, the ruleset mappings 126 can be defined by another application before being received and used to generate the dataflow graphs of the application 118. The ruleset mappings 126 can include rule sets from a single source or from many sources.

The ruleset mappings 126 can include logical rules. The logical rules define outputs that are determined based on the inputs received and are generally defined using terms that are particular to a specific application. The rules can be edited through the data ingestion interface of the client device 108. For example, a rules editor (such as business rules editor, BRE) interface can be presented to a user of the client device 108 for modifying the rules. Examples of a BRE are described in U.S. Pat. No. 9,002,770, which is incorporated herein by reference in entirety.

In some implementations, ruleset mappings 126 can include semantic files. The semantic files indicate what data represents in the transformed data 114 (e.g., specifying that "USD =U.S. Dollar," etc.). The semantic files can be used to identify what data are representing in the transformed data 114. For example, if two different fields of a data record are representing the same type of value (e.g., both are representing U.S. dollars), the ruleset mappings 126 can specify that those data fields have the same format as one another. In some implementations, another interface can be used, such as the interfaces described in U.S. patent application Ser. No. 15/997,278 filed Jun. 4, 2018, incorporated herein by reference in entirety. Ruleset mappings 126 are not limited to the examples provided. Rather, ruleset mappings 126 can include other logical rules used to transform source data 112 into transformed data 114 conforming to a particular set of data rules.

In some implementations, the ruleset mappings 126 can be exposed to a first user for editing, while the metadata files 110 are exposed to a second, different user for editing. This can enable a non-technical user to determine the ruleset mappings 126 for the data warehouse 106, without accessing the metadata files 110. An experienced developer is able to access and manipulate the metadata files 110 and determine how to enforce referential integrity (e.g., ensure that references in the data warehouse 106 are correct and valid) of the data warehouse 106, key mappings, and so forth. In this way, the integrity of the data warehouse 106 can be preserved without requiring an experienced or technical user to specify each of the rules of the data warehouse 106.

The metadata files 110 and/or ruleset mappings 126 are provided to a client device 108, e.g. through a user interface 122 of the client device 108. The client device 108 includes a graph configuration module. The client device 108 can include one or more general-purpose computers under the control of a suitable operating system, such as a POSIX-compliant operating system (e.g., UNIX, Linux, etc.). For example, the client device 108 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. Although the client device 108 is shown as a single device, the client device 108 can represent one or more devices that each send a portion of the metadata files 110 to the MDW compiler 102 for generating the application 118 configured to transform the source data 112 into transformed data 114. The user interface 122 includes a user-interactive interface that enables a user of the client device to specify the parameters of the ruleset mappings 126 and/or the metadata files 110. In some implementations, logic for the user interface is executed on the client device itself, while the MDW compiler 102 is executed on a backend system (such as a server) in communication with the client device.

Returning to FIG. 1B, the runtime environment 120 is shown. The MDW runtime system 124 receives data from one or more networked data sources 104. The networked data sources 104 can include computing systems and storage devices that are configured to send data to the MDW runtime system 124 for storage in a data warehouse 106. The networked data sources 104 include one or more sources of source data 112 such as storage devices or connections to online data streams, each of which may store data in any of a variety of storage formats (e.g., database tables, spreadsheet files, flat text files, or a native format used by a mainframe). In some implementations, the networked data sources 104 include one of each of a mainframe 104a, one or more operational databases 104b, and one or more client systems 104c. The MDW runtime system 124 receives the source data 112 and performs one or more operations on the source data to generate transformed data 114.

The MDW runtime system 124 configures the source data 112 to be stored in the data warehouse 106. In other words, the MDW runtime system 124 transforms the source data 112 into transformed data 114, though the physical storage system hardware on which the data warehouse 106 operates can exist prior to configuration of the data warehouse by the MDW runtime system 124. In some implementations, the metadata files 110 specify requirements for a pre-existing data warehouse (which can be data warehouse 106). In this example, the MDW runtime system 124 maintains (e.g., updates the data of) a data warehouse 106 that has already been initialized by preparing additional source data 112 to be stored in that data warehouse 106. In some implementations, the MDW runtime system 124 initializes a data warehouse 106 (e.g., on an existing hardware storage) and subsequently updates and/or maintains the data warehouse 106. The MDW runtime system 124 transforms the source data 112 into transformed data 114 ready to be stored in the data warehouse 106 using one or more dataflow graphs.

The source data 112 from the networked data sources 104 can include any data that is to be stored in the data warehouse 106. As stated previously, the source data 112 can be from many different kinds of sources, such as operational databases 104b, mainframes 104a, and client systems 104c, and each source can configure (e.g., format) source data 112 that it sends to the MDW runtime system 124 in a different way. The source data 112 can include either or both of flat files and relational tables. The data itself can include whatever the networked data sources 104 intend to store in the data warehouse 106.

The MDW runtime system 124 transforms the source data 112 into transformed data 114 that is formatted properly for storage in the data warehouse 106. The MDW runtime system 124 receives the source data 112 and transforms the source data into transformed data 114 based on a state of the data warehouse 106 at runtime. The application 118 is generally compiled in advance of runtime and operate on the source data 112 as it is received from the data sources 104. The MDW runtime system 124 can receive data from the data warehouse 106 to determine how to transform the source data 112 into transformed data 114. For example, the MDW runtime system 124 can perform a check on the data warehouse 106 to determine if key values of the source data 112 are already present in the data warehouse 106, presuming the key values of the source data 112 are otherwise valid for use as key values in the data warehouse 106. In this example, the data received from the data warehouse 106 can inform the MDW runtime system 124 whether, for a given data record of the source data 112, the runtime system should permit the data record to be loaded to the data warehouse 106 or not. In another case, the data received from the data warehouse 106 can inform the MDW runtime system 124 how, for a given data record of the source data 112, the runtime system should perform key surrogation on the data record, or whether a key surrogate should be generated at all.

The transformed data 114 satisfies the data rules that are used to compile the application 118. For example, the transformed data 114 satisfies the data rules for at least each of data history, data quality, data integrity, and data reporting, as described previously. For example, each field of a data record of the transformed data 114 includes the correct data for that respective field in the specified format, and a key value for the record conforms to the convention of the indexing being used. Assigning the correct key value to a data record may require determining, at runtime by the MDW runtime system 124, a surrogate key value (e.g., key surrogation) for the record.

Figure 2A:
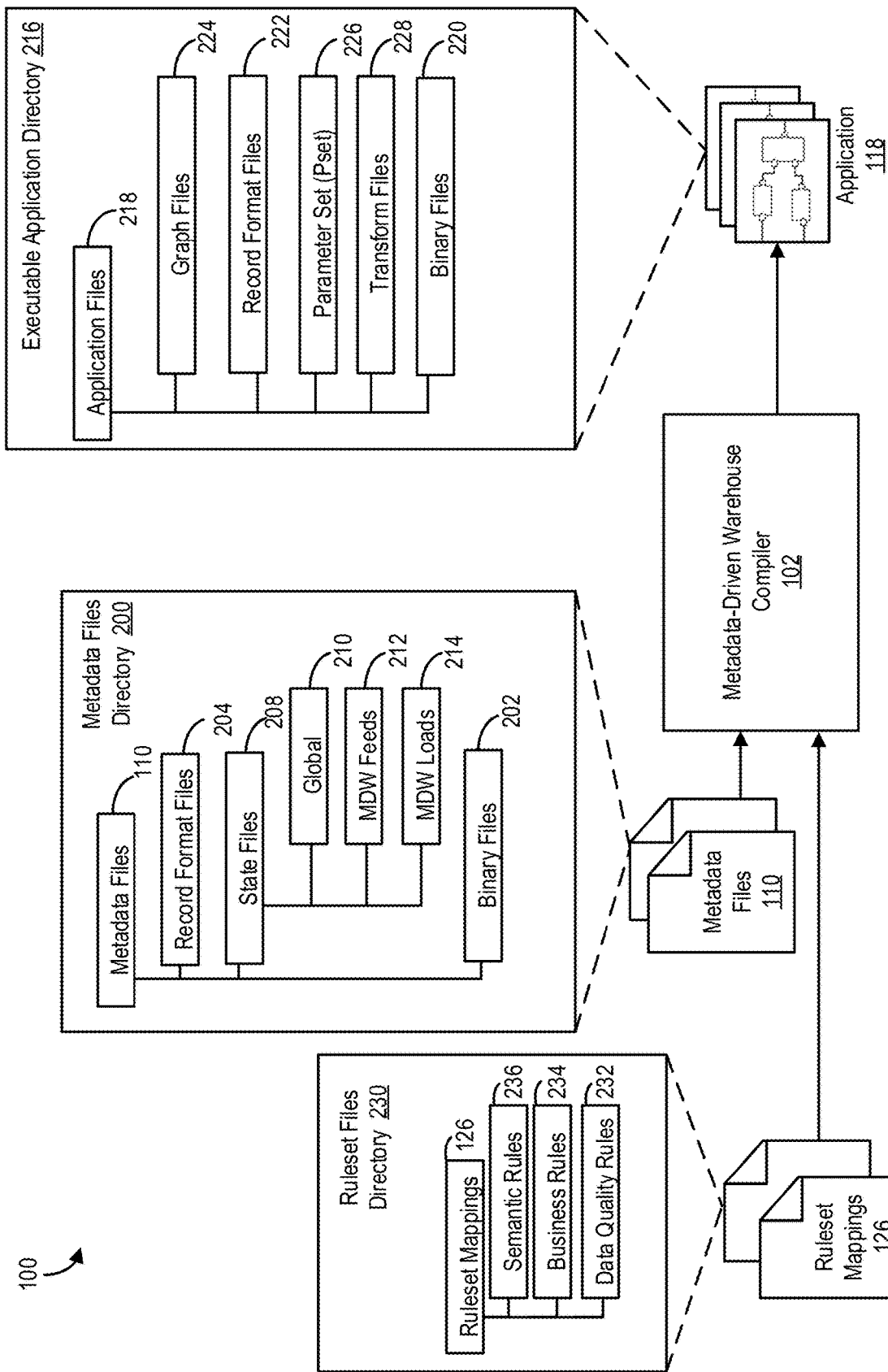
FIG. 2A shows an example of a metadata-driven data warehouse application compiled in the compiling environment of FIG. 1A.

Turning to FIG. 2A, the compiling environment 100 is shown. The compiling environment 100 includes the MDW compiler 102 which is configured to receive the metadata files 110 and generate the application 118. The metadata files 110 include a metadata file hierarchy 200. The metadata file hierarchy includes the metadata files 110 and the ruleset mappings 126 that are used to generate the application 118. The application 118 includes executable files in an application directory 216, which includes the dataflow graphs (e.g., as graph files 224) and other files referenced by the dataflow graphs during execution for transforming the source data 112 into the transformed data 114.

As previously described, the metadata files 110 include values of parameters which the MDW compiler 102 uses to determine functionality of the dataflow graphs of the application 118 that the MDW compiler 102 generates to process the source data 112. The values of the parameters determine how the dataflow graphs perform functions such as key handling, data historization, data quality enforcement, and data loading into the data warehouse 106.

The metadata directory 200 includes the ruleset mappings 126 and metadata files 110 of FIG. 1A. The metadata directory 200 includes binary files 202 (e.g., .bin files), record format files 204 (e.g., .dml files), graph files (e.g., .mp files), and state files 208. The directories shown in the metadata directory 200 are included for illustrative purposes, and other directories may also be included in the metadata directory 200. In some implementations, some of the files shown are not included in the metadata files 110. For example, the graph files (not shown), which generally include standard dataflow graphs that are configured to execute with the generated dataflow graphs in the application 118, can be omitted from the metadata files and generated by the MDW compiler 102.

Generally, the record format files 204 include .dml files that are used to define record formats for the graph files 224. Generally, the state files 208 define the particular parameters for generating the dataflow graphs that transform the source data 112 into the transformed data 114 for the data warehouse 106. The MDW compiler 102 generates the dataflow graphs of the application using the DML files and the parameters of the state files 208. The state files 208 include global files 210, metadata-driven warehouse (MDW) feed files 212, and MDW load files 214. For example, the global files 210 include schema definitions and key type and sequence definitions for transforming the source data 112. For example, the global files can include which key services to query for key surrogation. The global files 210 can include one or more .CSV files (or other tables) that include lists of parameters and their associated values for each graph to be compiled by the MDW compiler 102. The parameters can be default values or values that have been updated by a user. The MDW feeds 212 include the MDW feed parameters for the data warehouse 106. Specifically, the MDW feeds 212 define how transformed data 114 are prepared for load into the data warehouse 106 for all loads in accordance with the data rules of the metadata warehouse as described above. For example, the MDW feeds 212 can include feed parameters, such as the table of the data warehouse 106 for which the transformed data 114 is to be prepared, and rules for logging key handling statistics. The data warehouse loads 214 can include parameters for each particular load into the data warehouse 106 (e.g., data historization rules), if load-specific parameters are defined.

The metadata files 110 and ruleset mappings 126 generally are not executable files. Rather, they are editable files for which a user or the warehouse can specify behavior of the executable application directory 216 once the application is compiled. The user can set values through the user interface (e.g., user interface 122 of FIG. 1A) of the client device 108. The user interface 122 can present guided options for altering values in the metadata files 110 and help constrain changes to prevent contradictions, circular logic, or other potential errors from being introduced into the metadata files 110. For example, the user interface 122 can present only the parameters that are editable. The user interface 122 can restrict a user from altering a parameter to an invalid value, such as a value that contradicts one or more other parameter values. In some implementations, the user interface can highlight logical inconsistencies that are detected. In some implementations, the user interface 122 can allow an initial logical inconsistency in an updated parameter and subsequently update one or more other parameters to logically consistent values. For example, an alert could be presented on the user interface 122 indicating that changing a first parameter will cause two additional parameters to be changed to specified values.

Continuing with FIG. 2A, an example of a metadata-driven data warehouse application file hierarchy 216 is shown (hereinafter application directory 216). The application file hierarchy 216 is compiled in the compiling environment of FIG. 1A. Application files 218 of the application directory 216 include executable code for running in the MDW runtime system 124 to transform the source data 112 into the transformed data 114 for storage in the data warehouse 106. The application files 218 include metadata and ruleset mappings (e.g., from metadata files 110 and ruleset mappings 126) that are referenced by the executable code during execution. For example, the application files 218 include all dataflow graphs, which are stored as graph files 224, required to transform the source data 112 into the transformed data 114 according to the data rules defined by the ruleset mappings 126 and the metadata files 110. The dataflow graphs are represented by executable code (e.g., graphs files 224) in the application files 218. Generally, the metadata files 110 of the metadata hierarchy 200 described in relation to FIG. 2A define values of parameters that are in the files of the application files 218. In other words, the metadata files 110 of the metadata hierarchy are used during compilation of the application files 218 to generate one or more files of the application and/or define parameter values that the dataflow graphs refer to during execution.

The example application files 218 shown in FIG. 2A are shown in the form of a file hierarchy (generally, a directory hierarchy). Parameters of the ruleset mappings 126 and the metadata files 110 define one or more pathways of the application files 218 in the file hierarchy. A parameter can indicate that a first transform of a library of transforms is used by a dataflow graph to transform source data 112, rather than a second, alternative transform that is available in the application files 218. For example, the first transform can include a first rule for data quality, while the second transform includes a second, different rule for data quality. The parameter can indicate which data quality rule is applicable in a given situation.

The example application files 218 include directories that include binary files 220 (e.g., .bin files), record format files 222 (e.g., .dml files), graph files 224 (e.g., .mp files), parameter set files 226, and transform files 228 (e.g., .xfr files). While these directories are shown as an illustrative example, the application files 218 can include other directories with files configured to cause the MDW runtime system 124 to transform the source data 112 into the transformed data 114 according to the data rules of the data warehouse 106.

The graph files 224 form the dataflow graphs and reference other files in the application directory 216, such as the binary files 220, the record format files 222, and transform function files 230. The parameter set files 228 can be used to manually override parameter values for dataflow graphs defined in the graph files 224. The transform files 230 can include functions (e.g., data historization and reporting logic) defined for the application directory 216 that are executed in one or more components of the dataflow graphs of the graph files 224.

Figure 2B:
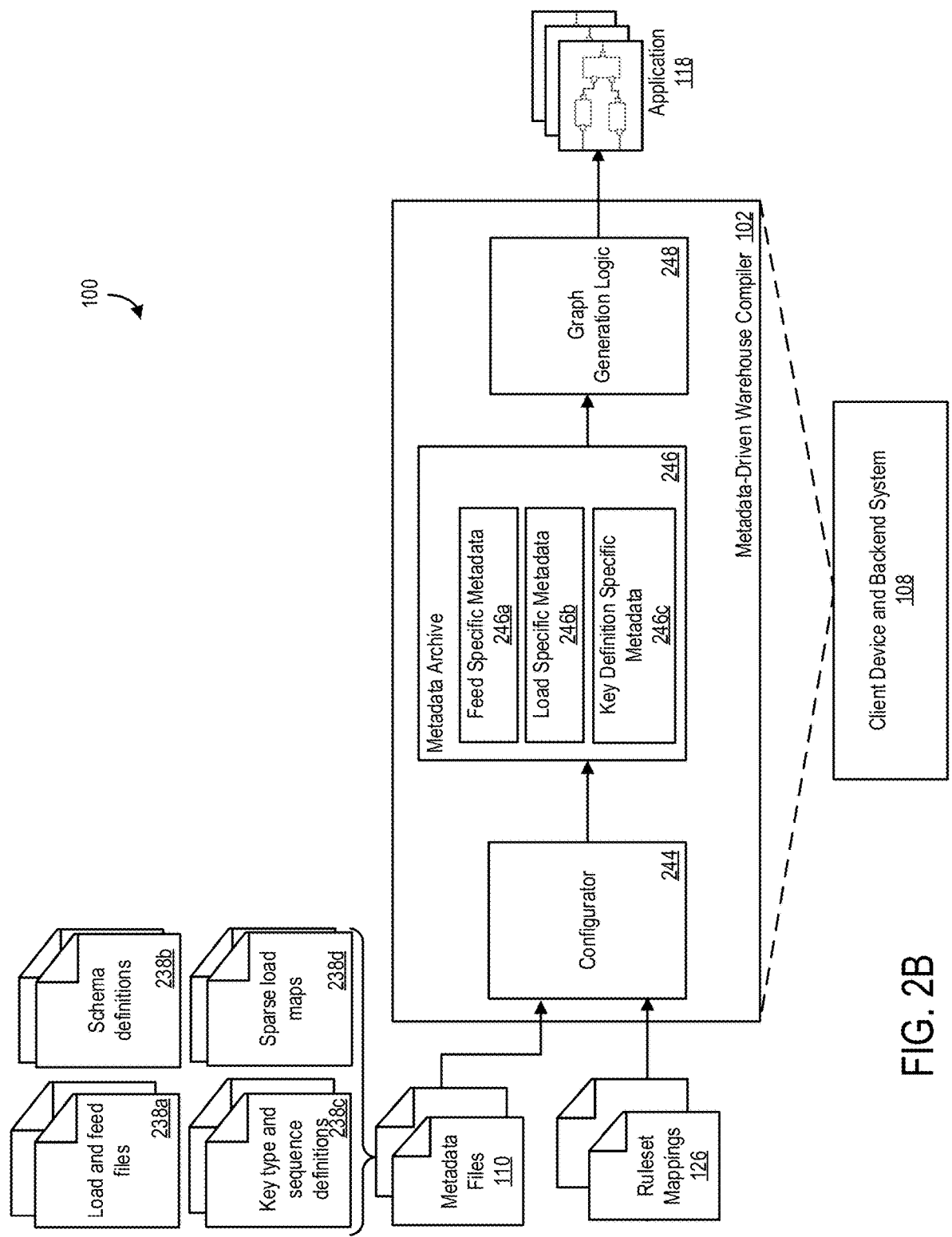
FIG. 2B shows an example environment for compiling dataflow graphs for a metadata-driven data warehouse application.

FIG. 2B shows an example environment for compiling dataflow graphs for the metadata driven data warehouse 106, such as compiling the application 118 from the metadata files 110 of the metadata hierarchy 200 to the executable application directory 216.

The metadata files 110 define the feed graph of the MDW runtime system 124. For example, the metadata files 110 define key surrogation, key handling for any acquired data, and historization of the data. The definition of the feeds/loads is performed automatically during the compiling stage. After the ruleset mappings and data quality metrics are received, the definitions of the feeds/loads is performed automatically during the compiling stage. The metadata files 110 include, for example load and feed files 238a, the schema definitions 238b, the key type and sequence definitions 238c, and the sparse load maps 238d.

The load and feed files 238a each list definitions of loads and feeds for the data warehouse 106. The load and feed files 238a can be included in the MDW feeds 212 and MDW loads 214 of FIG. 2A. The load and feed files 238a include load specific target tables (e.g., where transformed data 114 is to be loaded in the data warehouse 106). The load and feed files 238a specify the type of data history that is being used in the data warehouse 106. The load and feed files 238a specify which data field of the target table is the key field (e.g., the primary key for a referential database). The load and feed files 238a specify the type of data of the key field of the target table, the format of the key, and the type of table that is the target table (and may refer to key type files 238c). The load and feed files 238a specify which field of the target table includes the data history information (e.g., batch time). The load and feed files 238a include the parameters (e.g., over 80 parameters) for each of these aspects of the data warehouse 106, and these parameters are used to generate executable files by the MDW compiler 102.

The schema definitions 238b include target schema for the target tables of the data warehouse 106. For example, the schema definitions include field names (e.g., a name space of fields) and the configuration of the data entries of those fields. The schema definitions files 238b can specify whether the data warehouse 106 is a relational database, a data lake, etc. and what proprietary (or non-proprietary) data standard is being followed, if any. In an example file used to configure physical attributes of the data warehouse 106, the schema definitions 238b can include a schema (e.g., what data configuration scheme is being used), an entity (e.g., a name of the target), an attribute (e.g., a field name), data type (e.g., the data format such as a string, decimal, etc.), whether the value is nullable, and a key type (e.g., reference, primary, etc.).

The key type and sequence definitions 238c include the configuration of the keys for each target table. Because keys are a class of objects, the key type files 238c specify key types, key sequences, and how to perform key handling. For example, the key type files 238c can specify that the key value is a string, binary value, number, and so forth. The key type files 238c can specify key sequences for key surrogation (e.g., what are the minimum and maximum values allowed for the generation of sequential key values against a particular sequence). In another example, the key type and sequence definitions 238c can specify whether the keys for a target are natural keys or surrogate keys. In an example key definitions file 238c, each key definition can include a name and a key source (where the key comes from), which can specify the key type. The key source indicates whether, when preparing the transformed data 114, the original incoming key value is kept or whether a surrogate value is provided (e.g., by key surrogation services). The value of the key source can show what kind of key surrogate is provided.

The sparse load maps 238d include additional rules and/or attributes for loading the transformed data 114 into the data warehouse 106. For example, the sparse load maps 238d include names of fields and behavioral specifics for each of those fields. In an example file used to configure physical attributes of the data warehouse 106, the sparse load definitions can include an "ignore for load value" parameter (e.g., none, null or empty, etc.) and null or empty handling setting (e.g., whether to reject or ignore null or empty values).

The metadata files 110 are validated by a configurator 244. The configurator 244 includes a logic engine (e.g., a data processing engine). The configurator 244 is configured to receive the metadata files 110 and analyze the received metadata files 110 to determine values of parameters specified in the metadata files 110 for compiling the application 118. For example, the configurator 244 scans a header row of a .csv file included in a metadata file to determine which parameters are included in a metadata file. In an example, parameters that are not assigned a value in the metadata files 110 are assigned default values (e.g., from library of values). The configurator builds an archive of metadata for the data warehouse 106.

The configurator 244 validates the metadata files 110 of the file hierarchy 200 as follows. The configurator 244 retrieves the record format files associated with target locations of the data warehouse. The target locations are the locations in the data warehouse that are to be written to on a loading of the data warehouse. The record format files describe how the targets are formatted. The configurator assembles the global files (e.g., global files 210).

The configurator 244 checks feed specific metadata 246b. The feed specific metadata 246a includes key surrogation rules, such as which fields are affected by key surrogation, which key sequences get key surrogate values from a given field, and so forth. The rules that are retrieved from the feed specific metadata 246a are passed to the MDW runtime system 124 for use during execution, but are defined and validated at this stage to ensure referential integrity of the data warehouse. For example, each key value for the transformed data 114 is checked to ensure that another existing record is being referenced (and that no errors or null values are returned.)

The configurator 244 also checks load specific metadata 246b. The load specific metadata 246b can include historization rules for loading data into the data warehouse 106. As described above, the particular rules for data history (e.g., how a date field is formatted) can be particular to the data warehouse for each particular load.

In an aspect, rather than generating executable graphs that will perform key handling through feeds as described above, the MDW compiler 102 is configured to use key definition specific metadata 246c to generate a library of one or more key lookup/surrogation blocks. When defining one or more parameters of the data warehouse feed through another computing system (e.g., though a system described in U.S. patent application Ser. No. 15/997,278 filed Jun. 4, 2018, incorporated herein by reference in entirety), the user can specify, for example, the handling of key values for the data warehouse 106. This configuration for handling key values of the data warehouse 106, as well as the logic for handling key values by feeds using metadata 246a, 246b, is described in relation to FIGS. 4-5.

The graph generation logic 248 generates the executable dataflow graphs that execute key handling, historization, and loading of the source data 112 into the data warehouse 106 as transformed data 114. The graph generation logic 248 is separate from the generated dataflow graphs of the application 118. The graph generation logic 248 receives the configured metadata 246a, 246b, 246c from the metadata archive 246 for generation of the dataflow graphs of the application 118. Once the metadata have been validated by the configurator 244, the MDW compiler 102 generates one or more executable dataflow graphs of the application 118 using graph generation logic 248. The generated dataflow graphs of the application 118 include executable code in the application files 218 that can refer to the parameters of the metadata files 110 when needed. The locations of the metadata files 110 and graphs files 224 are such that the MDW compiler 102 can access the files during compilation without intervention from a user to generate each of the dataflow graphs. The generated dataflow graphs of the application 118 may include key handling graphs as well as a historization-and-load graph.

The dataflow graphs include graphical representations (e.g. nodes) of data processing components. For example, referring to FIG. 3, a generic dataflow graph 300 includes data sources 302a-302n, a component 304, and a data sink 306. The data sources 302a-302n are connected to the input port of the component 304. The output port of the component 304 is connected to the data sink 306. The connections between the data source, the component, and the data sinks define the data flow through the dataflow graph.

Each of the data source 302a-302n, the component 304, and the data sink 306 is associated with a parameter set 308a-n, 310, and 312, respectively. Each parameter set includes one or more parameters. The parameters and their values define the behavior of the dataflow graph. For example, a parameter can define the location of the data source or data sink on a physical disk. A parameter can also define the behavior of a component, such as how a sorting component sorts the data input into the component. In some examples, values for the parameters in a parameter set are populated at run time of the dataflow graph.

In some examples, the value of one parameter can depend on the value of another parameter. For instance, a data source may be stored in a file in a particular directory. The parameter set for the data source can include a first parameter called "DIRECTORY" and a second parameter called "FILENAME." In this example, the FILENAME parameter depends on the DIRECTORY parameter (e.g., DIRECTORY may be "/usr/local/" and FILENAME may be "input.dat"). Parameters may also depend upon the parameters for other components. For example, the physical location of a data sink for a dataflow graph may depend upon the physical location of the data source for the dataflow graph. For instance, a data sink can include a set of parameters which includes a FILENAME parameter which depends upon the DIRECTORY parameter of the data source (e.g., the FILENAME parameter for the data sink may be "/usr/local/output.dat" where the value "/usr/local/" is obtained from the DIRECTORY parameter for the data source).

The component 304 can be a graph interface component that references one or more other dataflow graphs 320a-320n, sometimes referred to as subgraphs. At run time, the dataflow graph 300 dynamically loads and executes the subgraph(s) referenced by the component 304, e.g., enabling the dataflow graph 300 to flexibly access various functionalities provided by the subgraphs 320a-320n. One or more parameters of the component 304 defines the specific subgraph(s) 320a-320n referenced by the component 304. Each subgraph 320a-320n is also associated with a parameter set 322a-322n including one or more parameters, each of which defines the behavior of the corresponding subgraph.

The construction of a dataflow graph is highly technical in nature. While written to also achieve specific business ends, the underlying structure and construction of the graph is determined based upon technical considerations. For example, graph components may be selected to maximize reusability, or to support parallel processing. On the other hand, where a graph is used may be largely a business decision. Some of the parameters associated with a parameterized dataflow graph can be used to enable business users to customize dataflow graphs without requiring the user to understand the technical complexities behind its implementation. The parameterized dataflow graphs simplify customization and facilitate reuse.

An interface for identification of parameter values for constructing a dataflow graph can be presented on a client machine. In some implementations, the client may be accessing a development environment running on a server using a web browser on the client that provides the parameter interface, and using a scripting language which provides some capability for client side processing. The scripting language may communicate with the server to update parameters and perform other necessary operations. This communication may occur via a bridge machine which translates the communications between the client and the server running a development environment storing objects and associated parameter values for the graphs being constructed. The interface allows a user to configure the parameters of a parameterized dataflow graph even if the user lacks technical knowledge relating to dataflow graphs and dataflow graph configuration.

A configuration interface, presented on the client device 108, enables a user to access a graph configuration module (not shown). Through the configuration interface, the user can specify characteristics of the data source, the data sinks, and the transformations to be performed by the dataflow graph, without needing technical knowledge about dataflow graph configuration. Based on the characteristics specified by the user, parameter values can be assigned for the parameter sets 308a-n, 310, 312, 322a-322n thus defining the behavior of the dataflow graph according to the characteristics specified by the user.

Within the configuration interface, the parameters of the parameter sets 308a-n, 310, and 312 can be combined and reorganized into groups for interacting with a user, e.g., reflecting business considerations rather than technical considerations. The configuration interface for receiving values for the parameters based on user input can display different parameters according to relationships among parameters in a flexible way that is not necessarily restricted by aspects of the development environment on the server. An example of a configuration interface is described in U.S. Publication No. 2011/0145748, the contents of which are incorporated here by reference in their entirety.

The MDW compiler 102 compiles the application 118 including the dataflow graphs with parameters (e.g., that form parameter sets 308a-n, 310, and 312 of FIG. 3), and the parameters are specified by the metadata files 110. Examples of graphs that are generated are described below.

The dataflow graphs that the MDW compiler 102 compiles are configured to transform the source data 112 into the transformed data 114. For example, a dataflow graph can be configured to run SQL queries that have been generated by the MDW compiler 102 using parameters of the metadata files 110 that specify field names, index values, etc. Many different configurations of instantiated dataflow graphs can be generated. In some implementations, the MDW compiler 102 checks the metadata files 110 at runtime to validate the metadata files as being complete (e.g., that the MDW compiler 102 can compile graphs from the metadata files).

Figure 4:
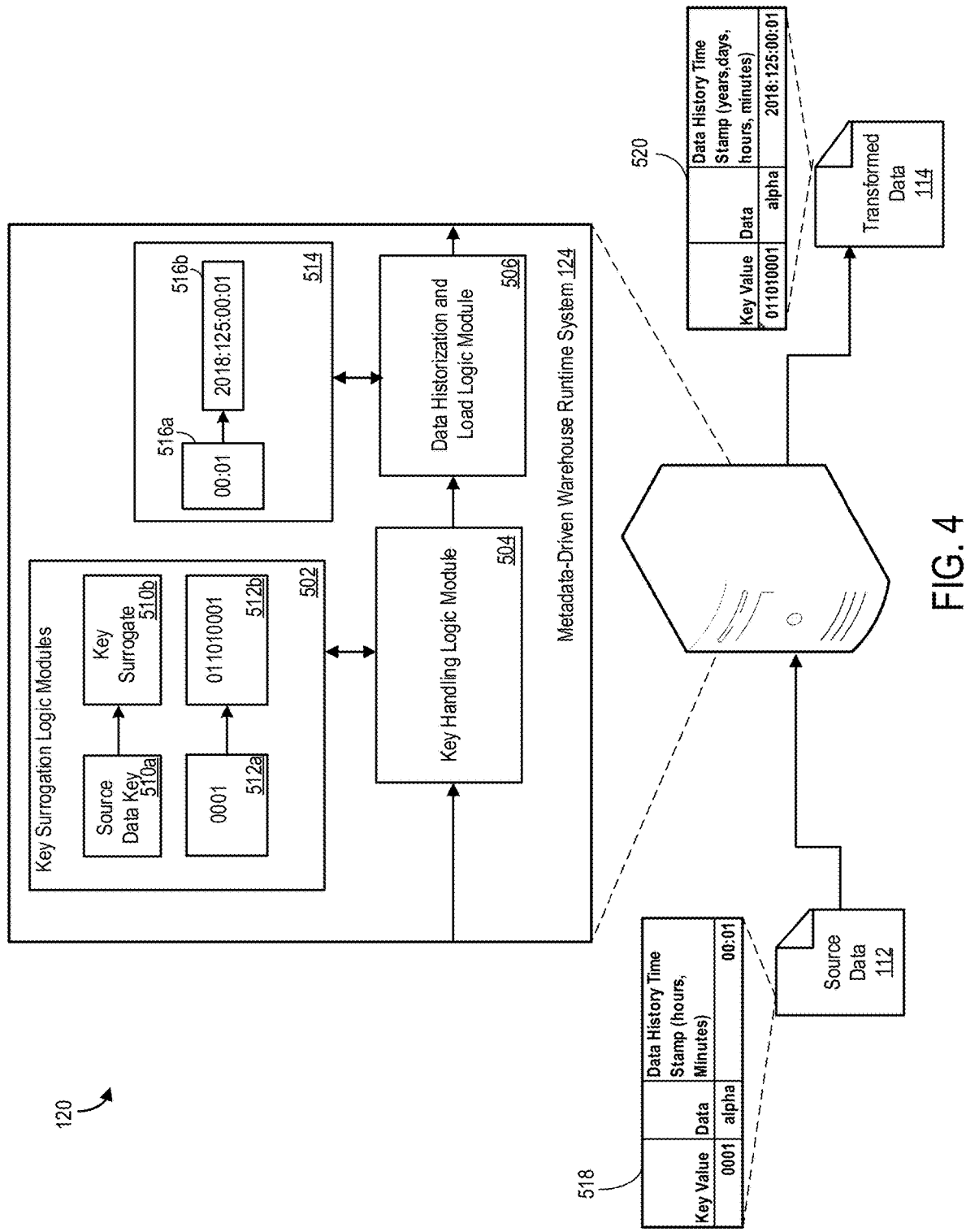
FIG. 4 shows an example runtime system belonging to a metadata-driven warehouse application.
Figure 5:
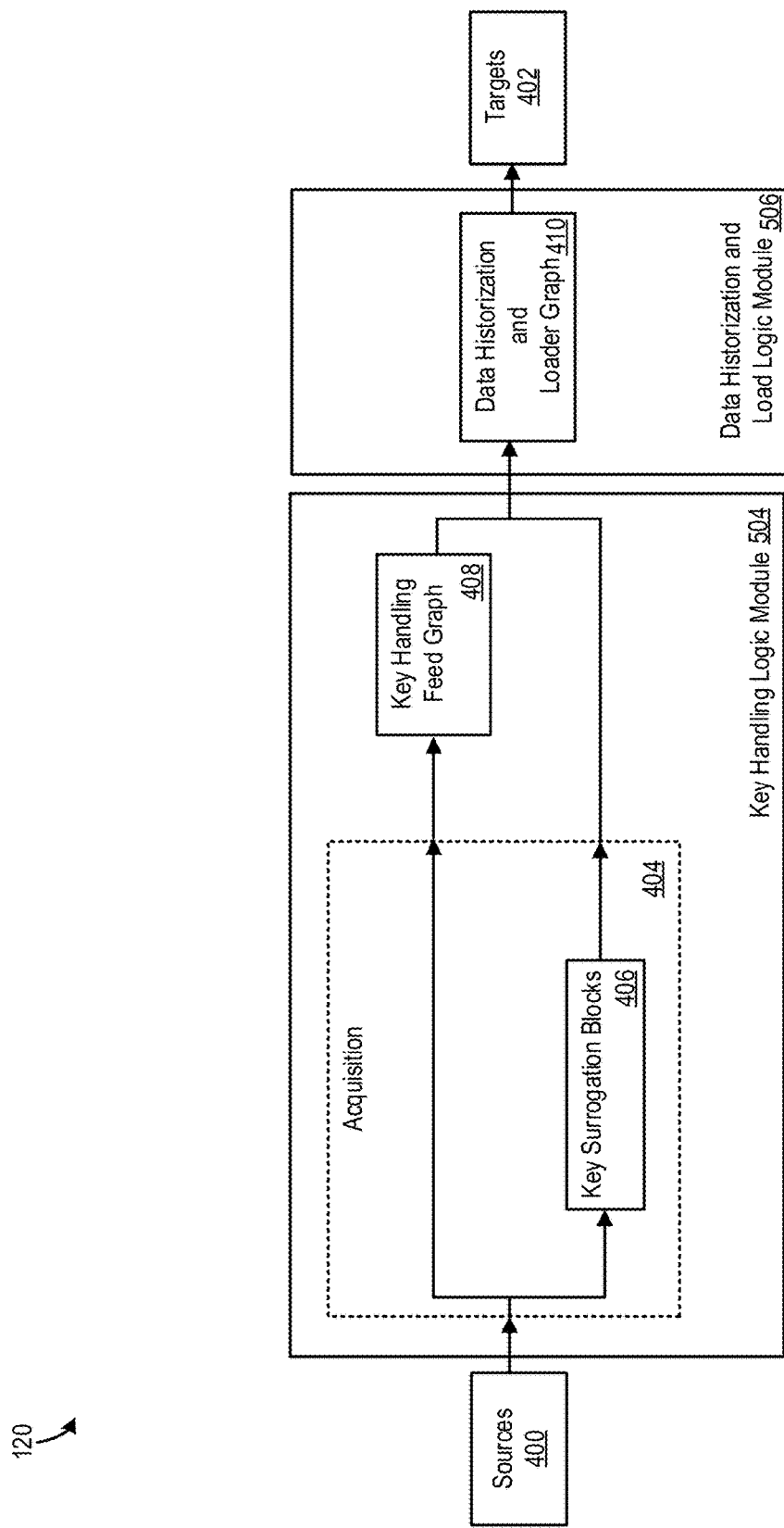
FIG. 5 shows examples of graphs for transforming data for a data warehouse.

Example dataflow graphs for transforming the source data 112 into the transformed data 114 in the runtime environment 120 by the MDW runtime system 124 are shown in FIGS. 4-5. FIG. 4 shows an example of the MDW runtime system 124. FIG. 5 shows key handling in the context of the runtime environment 120. The MDW runtime system 124 includes a plurality of logic modules 502, 504, and 506 that execute the logic of the graphs 404-414 of FIG. 5 and otherwise prepare the source data 112 for storage in the data warehouse 106. In some implementations, each of the logic modules 502, 504, and 506 includes one or more dataflow graphs configured to execute executable code compiled from dataflow graphs based on the metadata files 110 and the ruleset mappings 126 received at the client device 108. For example, the logic of blocks 406 and graphs 408, and 410 described in relation to FIG. 5 are configured to operate on source data 112 as it is received from the networked sources 104a-c. The logic modules of the MDW runtime system 124 can perform key surrogation logic and data historization logic.

The key surrogation logic modules 502 includes key services for generating surrogate keys as described in relation to FIGS. 1A-1B and FIG. 5. In some implementations, the key surrogation logic modules 502 include the key surrogation blocks 406 of FIG. 5. Each source data key 510a, 512a that is a part of the source data 112 can be transformed into a respective key surrogate 510b, 512b if specified by the data rules as previously described. The key surrogates 510b, 512b are each assigned to transformed data entries of the transformed data 114. The key surrogation logic modules 502 receive the configured metadata and ruleset mappings from the metadata archive 246 to determine what surrogate keys 510b, 512b are to be generated for the transformed data 114. In some implementations, the key surrogation logic modules 502 include a dedicated process for each key sequence and dedicated calls to each key service for the data warehouse 106. For example, a separate graph can be used for each process. In the example shown, a source key 512a having a value of "0001" for a source record 518 is transformed into a target key 512b for a record of the transformed data 520. The target key 512b has a value of "011010001" and represents a surrogate key that conforms to the requirements of the data warehouse 106. Referential integrity enforcement is also performed, as described in relation to FIG. 5.

The data historization and load logic module 506 operates on source data 112 to generate the appropriate data history for each data record as described above in relation to FIGS. 1A-1B and FIG. 5. For example, the data historization and load logic module 506 can include the data historization and loader graph 410 of FIG. 5.

The key handling logic module 504 performs handling logic for transforming the key field data in source data 112 in to the key field data in target data 114. In some implementations, the key handling logic module 504 includes the key handling feed graph 408 of FIG. 5. For example, the source data record 518 has a data historization scheme in which a time stamp is included in the record when the record is updated. The value of the time stamp 516a is "00:01." This time stamp 516a of the source data record 518 is transformed to comport with the historization scheme of the data warehouse 106, which requires more precision for the time stamp value. The time stamp 516a value "00:01" is transformed to "2018:125:00:01" which can reflect a time in which the record 520 is generated and/or loaded into the data warehouse 106.

FIG. 5 shows key handling in the context of the runtime environment 120. The dataflow graphs of the application, which are automatically generated by the MDW compiler 102, are shown in FIG. 5. Key handling logic can be encapsulated by the MDW compiler 102 in generated stand-alone key handling feed graphs 408, or else in generated key lookup blocks 406, provided for the use of another computing system, which access the key surrogation services.

In an aspect, when the MDW runtime system 124 acquires data (e.g., at an interface 404), the MDW runtime system 124 can perform operations on the source data 112 to transform the source data into transformed data 114 as previously described. The operations include key handling, data historization, and data loading into the target(s) (e.g., data warehouse 106).

For key handling, the MDW runtime system 124 generally sends a request to one or more key surrogation services. Each module of the key surrogation blocks is configured to perform key handling according to a particular specification. For example, if a target 402 is configured with key values in a first format, a first module of the modules can be called by the MDW runtime system 124 to check keys of the source data 112 and generate surrogate keys as needed. If the target 402 is configured with key values in a second format, a second, different module of the modules can be called by the MDW runtime system 124 to perform key handling.

In an aspect, the MDW compiler 102 is configured to perform key handling functions in a key handling feed graph 408. Rather than call a service via blocks used by another computing system, the MDW runtime system 124 calls the key services directly through stand-alone executables.

In some implementations, the key handling feed graph 408 or the key surrogation block 406 do not need to generate a key surrogate, but only to check the referential integrity of the source key value within the target data warehouse 106. In this example, rather than generating a key surrogate, the key surrogation block 406 or key handling feed graph 408 verifies and enforces referential integrity for the key value without changing the key value. A referential integrity check is a verification that the key value in question is a valid value already known to the target data warehouse 106.

In performing the referential integrity check, the key handling feed graph 408 can use one or more enforcement mechanisms for handling unknown key values. The key handling feed graph 408 can be configured to reject a key and/or the data record associated with the key. The key handling feed graph 408 can substitute the key with a configurable flag key value that provides a signal to one or more systems operating on the data record associated with the flag key value that data record should be handled in a particular way. For example, the flag key value can indicate that the key value should be replaced with another key value at a later time. For example, the flag key value can indicate that the associated data in the data record including the flag key value is invalid. Other such information can be indicated by the flag key. The key handling feed graph 408 can construct a placeholder record (e.g., one or more placeholder data entries) for the data warehouse 106. The placeholder data entries can be updated at a later time when more information is received regarding the key value of the data record. The key surrogation blocks 406 will add a status flag to each incoming key value indicating whether or not it embodies a referential integrity violation (i.e., whether or not it is known to the target data warehouse 106), which can inform the enforcement mechanisms supported by the other source-acquiring computing system in which key surrogation blocks 406 are used.

In an aspect, a key value of a data element of the source data 112 can require a key surrogate for the data element to conform to the data rules of the data warehouse 106. The key surrogation blocks 406 or the key handling feed graph 408 performs the following operations for determining key values for each data record of the source data 112. The key surrogation blocks 406 or the key handling feed graph 408 is configured to generate a key surrogate when a value of a key in the source data 112 does not conform to the key scheme of the data warehouse 106. The key surrogates are replacement keys that replace the key used in each individual networked data source 104a-c. The key surrogates are used to ensure that each record in the data warehouse 106 has a unique key value and/or a consistent key value with the rest of the data in the data warehouse 106. The indexing systems used in each of these networked data sources 104 are replaced with a single, unified index for the data warehouse 106. For example, keys of networked data source 104a can include integer values, while keys of networked data source 104c include alphanumeric strings. The key surrogation blocks 406 or the key handling feed graph 408 performs a key census and lookup function to determine what the key values should be in the data warehouse 106 for source data 112 from each networked data source 104a-c. For example, the key handling feed graph 408 identifies a key value for a data record of a networked data source 104c. The key surrogation blocks 406 or the key handling feed graph 408 causes the MDW runtime system 124 to send a request to a key service to determine whether the key identified by the key census function has been surrogated already. If the identified key has no key surrogate in the data warehouse 106, and the configured rules specify that a new surrogate is allowed to be generated in this context, the key surrogation service determines a new key value to be the surrogate key for the identified key. The key surrogation blocks 406 or the key handling feed graph 408 applies the surrogate keys to the data entries before data is loaded into the data warehouse 106. In some implementations, key surrogates are calculated by batch. In some implementations, a dedicated graph is generated for each key sequence of the source data 112. A key collection consists of a map of key values used in the source to surrogate key values belonging to the configured key sequence.

The generated data historization and loader graph 410 computes data history for each entity described in the source data 112 as required by the data warehouse 106 and prepares the data for loading into the data warehouse 106. Changes to data history for each entity described in the source data 112 are included in the transformed data 114. For example, the data historization and loader graph 410 can include a dataflow graph. The data historization and loader graph 410 can be configured to generate a time stamp for each record in the transformed data 114, an updated date range for the data record, etc. and update the data history stored in the data warehouse when necessary. In some implementations, the data historization and loader graph 410 can flag stored data in the data warehouse 106 as outdated when a newer data record is received from the data sources 104 to replace that stored data. Both data historization and key surrogation are performed at runtime when the source data 112 are received from the data sources 104.

The data historization and loader graph 410 is configured for preparing the source data 112 for loading into the data warehouse 106 as transformed data 114. The data historization and loader graph 410 supports loads of varying historical scope. The data historization and loader graph 410 correctly reconciles established history with late-arriving data loads and error correction loads.

Figure 6:
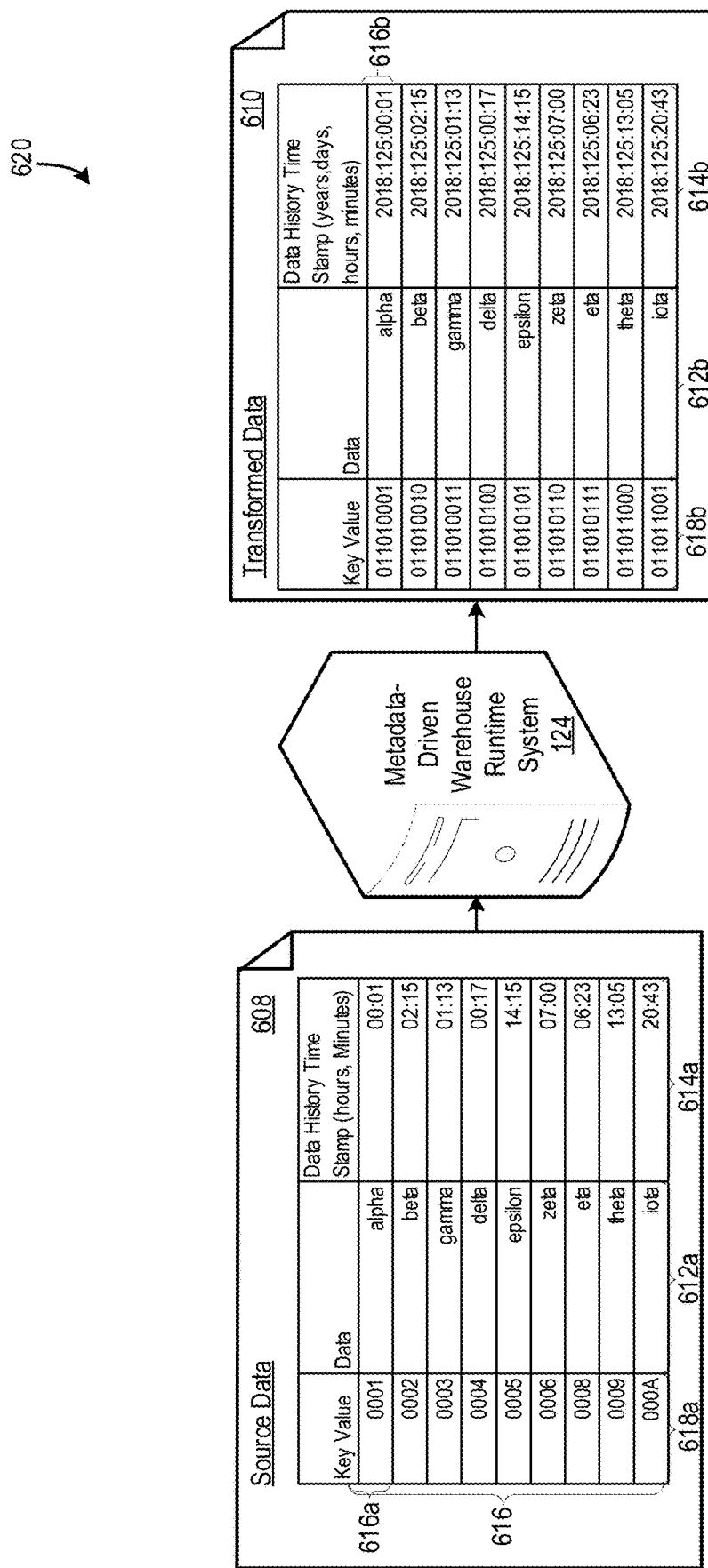
FIG. 6 shows an example environment for transforming data for a data warehouse.

FIG. 6 shows an example runtime environment 620 for generating example transformed data 610 for a data warehouse (e.g., data warehouse 106 of FIG. 1B) from source data. The source data 608 and transformed data 610 include example data entries 616 and fields including a key value field 618, a data field 612, and a data history field 614.

The MDW runtime system 124 receives source data 608. In this example, each data record (e.g., record 616a) of the source data 608 includes three fields: index 618a, data 612a, and time stamp 614a. The source data 608 are transformed in the logic modules 502, 504 and 508 of the MDW runtime system 124. In this example, each data record of the source data 608 is assigned a new key that conforms to a standard of the data warehouse 106. In this example, new keys are assigned, but this is not always required. In some implementations, key values can remain unchanged for some or all of the records. The transformed data 610 is prepared for storage in the data warehouse 106. Each record (e.g., record 616b) of the transformed data 610 includes three fields, including a key field 618b, data 612b, and time stamp 614b, corresponding to fields 618a, 612a, and 614a, of the source data 608, respectively. Record 616a of the source data 608 corresponds to record 616b of the transformed data 610. The index of the record 616a of the source data 608 is "0001," which was, for example, the first record of an operational database storing the source data. The index of the record 616b of the transformed data 610 is "011010001," which corresponds to the indexing scheme for the data warehouse 106. The data of record 616a which is "alpha" has remained unchanged in record 616b. The timestamp of record 616a is "00:01", which may represent a time when the data of record 616a was last updated. The record 616b of the transformed data 610 has transformed timestamp of "2018:125:00:01," representing a transformed timestamp in a format specified for the data warehouse 106. Although the transformation of data record 616a to the source data 608 to data record 616b of the transformed data 610 is one example, numerous other transformations are possible in accordance with the previous and subsequent descriptions.

Figure 7:
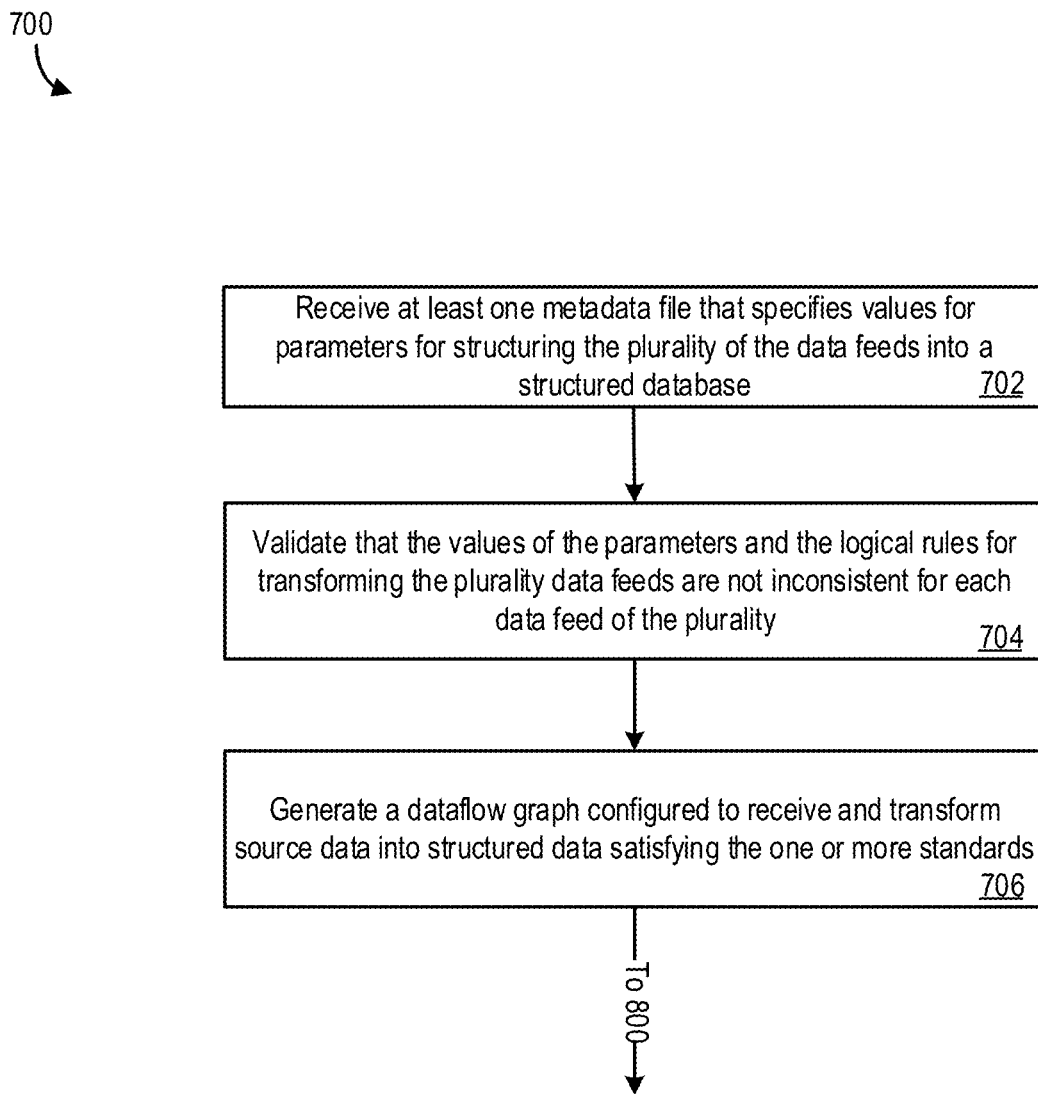
FIG. 7 includes a flow diagram of actions for compiling dataflow graphs for a metadata-driven warehouse application.

FIG. 7 includes a flowchart of actions for compiling dataflow graphs for a metadata-driven warehouse application. A computing system (e.g., the MDW compiler 102 of FIG. 1A) receives (702) at least one metadata file that specifies a value for each of one or more parameters for structuring data into a structured database. The parameters can include parameters for data quality, data integrity, data reporting, key surrogation, data history, and so forth. The MDW compiler 102 analyzes (e.g., by a configurator 244 of FIG. 2B) the received metadata files 110 to determine values of parameters specified in the metadata files 110 for compiling the dataflow graphs. The MDW compiler 102 validates (704) that the values of the parameters and the logical rules for transforming the plurality data feeds are logically not inconsistent for each data feed of the plurality the metadata. The validation is performed by determining that all loads/feeds are completely defined and that the global files are congruent with each load or feed, so that the loads/feeds are logically not inconsistent. To do this, in an aspect, the MDW compiler 102 checks the metadata archive for feed specific metadata and load specific metadata. The MDW compiler 102 checks the feed-specific metadata, which can include key surrogation rules, such as the fields which are affected by key surrogation, the key sequences from which these fields get key surrogate values, and so forth, which will be used at runtime to ensure that each key is valid and has a meaningful value in the data warehouse. In an aspect, the MDW compiler 102 checks load specific metadata, which can include historization rules for loading data into the data warehouse. The MDW compiler 102 generates (706) at least one dataflow graph for a runtime environment (e.g., runtime environment 120 of FIG. 1B). The dataflow graph(s) can be configured to perform key surrogation, historization, data quality, and data loading operations at runtime. Each dataflow graph is configured to receive source data (e.g., source data 112 of FIG. 1B) from one or more data sources and transform the source data into structured data that satisfies the one or more standards for the structured data record as defined by the parameters of the metadata.

Figure 8:
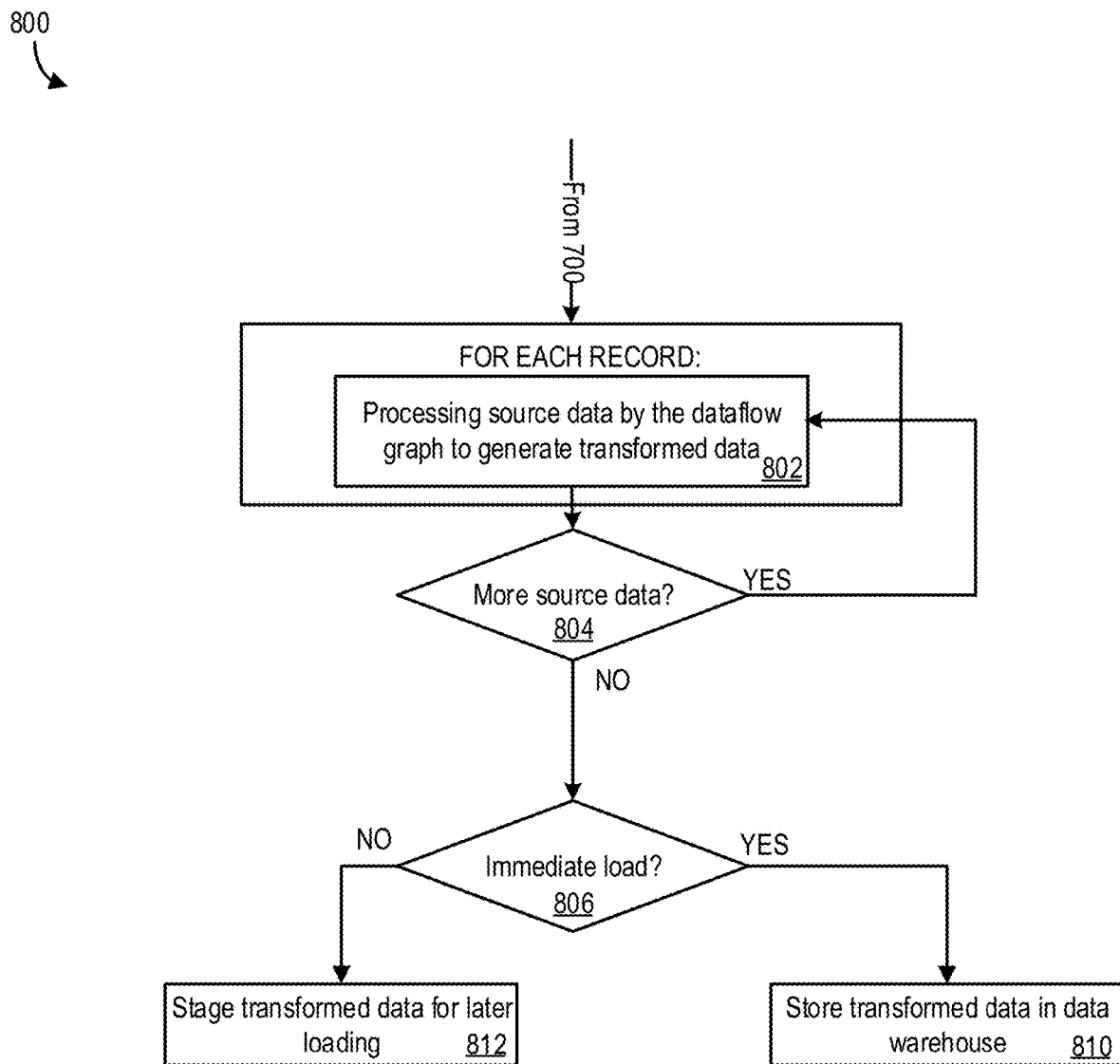
FIG. 8 includes a flow diagram of actions for the runtime transformation and load of data to a data warehouse by metadata-driven warehouse application dataflow graphs.

Turning to FIG. 8, a flow diagram of actions for the runtime transformation and load of data to a data warehouse by metadata-driven warehouse application dataflow graphs. When source data (e.g., source data 112) are received by a runtime system (e.g., MDW runtime system 124 of FIG. 1B), the dataflow graphs of the MDW runtime system 124 process the source data. For each record, a dataflow graph of the MDW runtime system 124 processes (802) the source data to transform the data into transformed data (e.g., transformed data 114 of FIG. 1B) that satisfies the one or more standards for structured data as defined by the data rules. The MDW runtime system 124 determines (804) whether there is more source data. If there is more source data, the dataflow graph further processes the source data and transforms it into transformed data that satisfies the one or more standards for structured data of the data rules. The MDW runtime system 124 can process the transformed data 112 in parallel with processing additional source data 112. The MDW runtime system 124 determines (806) whether an immediate load of the transformed data 114 is desired, or whether a later load of the transformed data is preferred. A later load of the transformed data can be preferable when the data warehouse 106 is not ready to accept new data. For example, another system may be reading data from the data warehouse 106. If an immediate load is desired, the MDW runtime system 124 stores (810) the transformed data in the data warehouse (e.g., data warehouse 106 of FIG. 1B). If a later load is preferred, the MDW runtime system 124 stages (812) the source data 112 for loading at a later time.

When the MDW runtime system 124 stages the source data 112 for loading at a later time, the key handing is still done at runtime. This is because, when key services are invoked (as previously described), the key services account for the staged data when assigning further key values to other loads.

The graph configuration approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of charts and flowcharts. The nodes, links and elements of the chart can be implemented as data structures stored in a computer readable medium or other organized data conforming to a data model stored in a data repository.

The techniques described herein can be implemented in digital electronic circuitry, or in computer hardware, firmware, software, or in combinations thereof. An apparatus can be implemented in a computer program product tangibly embodied or stored in a machine-readable storage device (e.g., a non-transitory machine-readable storage device, a machine-readable hardware storage device, and so forth) for execution by a programmable processor; and method actions can be performed by a programmable processor executing a program of instructions to perform functions by operating on input data and generating output. The embodiments described herein, and other embodiments of the claims and the techniques described herein, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood by one of ordinary skill in the art that various modifications may be made without departing from the spirit and scope of the claims and the techniques described herein.

What is claimed is:

1. A method for automatically generating an executable application to transform and load data into a structured dataset for storing data from one or more networked data sources, comprising:
   receiving at least one metadata file that specifies values for parameters and ruleset mappings specifying logical rules for transforming data feeds, wherein each data feed is to be received from a networked data source, and loading results of transforming into a structured dataset;
   validating that the values of the parameters and the logical rules for transforming the data-feeds are not inconsistent for each data feed;
   generating, based on the validating, data rules that specify one or more standards in accordance with the validated values of the parameters and the validated logical rules for transforming each data feed into a transformed record for loading into the structured dataset; and
   generating, based on the generated data rules that specify the one or more standards, an executable data processing application for a runtime environment, the executable data processing application configurable to:
   receive source data comprising a data feed from one or more data sources; and
   transform the source data into transformed data that satisfies the one or more standards of the structured dataset in compliance with the generated data rules,
   wherein the source data includes a data record, and wherein a parameter of the metadata file specifies a field of the data record that represents a key value for the data record of the source data, and
   wherein a parameter of the metadata file specifies a mapping between the field that represents the key value of the source data and a field of the structured dataset that represents a key value of the structured dataset.

2. The method of claim 1, wherein the executable data processing application includes a dataflow graph, a dataflow subgraph, or a plurality of dataflow graphs.

3. The method of claim 1, wherein the structured dataset includes a database.

4. The method of claim 1, wherein a parameter of the metadata file specifies a format of the key value, and wherein the executable data processing application is configured to transform the key value to have the format specified by the parameter.

5. The method of claim 1, further comprising:
   retrieving a default value for a parameter from a data storage; and
   defining the data rules based on the default value of the parameter.

6. The method of claim 1, wherein a logical rule specifies a format for a field of the structured dataset, the field including a data history value.

7. The method of claim 6, wherein the data history value includes a time stamp indicative of when the structured dataset including the data history value is updated.

8. The method of claim 1, wherein receiving the metadata file includes parsing a header row of the metadata file to determine which parameters have specified values in the metadata file.

9. The method of claim 1, wherein transforming the source data into structured data that satisfies the one or more standards for the structured dataset as defined by the data rules includes:
   determining that at least two different portions of the source data specify identical key values; and
   specifying a new key value for at least one of the two different portions of the source data, the new key value being different from the identical key values and based on a key sequence of the structured dataset.

10. The method of claim 1, comprising retrieving one or more default values for one or more additional parameters that are not specified by the at least one metadata file, wherein defining the data rules is based on the default values of the one or more additional parameters.

11. The method of claim 1, wherein the metadata file includes one or more semantic rules that specify a label for interpreting values of the transformed record.

12. The method of claim 1, wherein the parameters of the metadata file include a data quality parameter that specifies acceptable data values for including in the transformed record.

13. The method of claim 1, wherein the parameters of the metadata file include a data integrity parameter that specifies a key mapping scheme for the transformed record.

14. The method of claim 1, wherein the parameters of the metadata file include a data reporting parameter that specifies whether the transformed record of the structured dataset is configured to be read-optimized or write-optimized.

15. The method of claim 1, wherein validating that the values of the parameters and the logical rules for transforming the plurality of the data feeds are not inconsistent for each data feed includes performing a check on feed-specific metadata specifying a key surrogation rule and load-specific metadata specifying a data historization rule.

16. The method of claim 1, wherein the executable data processing application is further configured to load the transformed data into the structured dataset.

17. The method of claim 1, further comprising:
   executing, by the runtime environment, the executable application, the executing including:
   receiving the source data comprising a data feed from one or more data sources; and
   transforming the source data into the transformed data that satisfies the one or more standards; and
   loading the transformed data in compliance with the data rules into the structured dataset.

18. A system for generating an executable data processing application to transform and load data into a structured dataset for storing data from one or more networked data sources, the system comprising:
   one or more processors; and
   a memory storing instructions that, when executed by the one or more processors, causes the one or more processors to perform operations comprising:
      receiving at least one metadata file that specifies values for parameters and logical rules for transforming data feeds, wherein each data feed is to be received from a networked data source, and loading results of transforming into a structured dataset;
      validating that the values of the parameters and logic of the logical rules for transforming the data feeds are not inconsistent for transforming each data feed;
      generating, based on the validating, data rules that specify one or more standards in accordance with the validated values of the parameters and the validated logical rules for transforming each data feed of the data feeds into a transformed record for loading into the structured dataset;
      generating, based on the generated data rules that specify the one or more standards, an executable data processing application for a runtime environment, the executable data processing application configurable to:
      receive source data comprising a data feed from one or more data sources; and
      transform the source data into transformed data that satisfies the one or more standards for the structured dataset in compliance with the generated data rules,
      wherein the source data includes a data record, and wherein a parameter of the metadata file specifies a field of the data record that represents a key value for the data record of the source data, and
      wherein a parameter of the parameters of the metadata file specifies a mapping between the field of the source data that represents the key value and a field of the structured dataset that represents a key value of the structured dataset.

19. The system of claim 18, wherein the executable data processing application includes a dataflow graph, a dataflow subgraph, or a plurality of dataflow graphs.

20. The system of claim 18, wherein the structured dataset includes a database.

21. The system of claim 18, wherein a parameter of the parameters of the metadata file specifies a format of the key value for a structured dataset of the structured dataset, and wherein the executable data processing application is configured to transform the key value to have the format specified by the parameter.

22. The system of claim 18, the operations further comprising:
   retrieving a default value for a parameter from a data storage; and
   defining the data rules based on the default value of the parameter.

23. The system of claim 18, wherein a logical rule specifies a format for a field of the structured dataset, the field including history data.

24. The system of claim 18, wherein receiving the metadata file includes parsing a header row the metadata file to determine which parameters have specified values in the metadata file.

25. The system of claim 18, wherein transforming the source data into transformed data that satisfies the one or more standards for the structured dataset as defined by the data rules includes:
   determining that at least two different portions of the source data specify identical key values; and
   specifying a new key value for at least one of the two different portions of the source data, the new key value being different from the identical key values and based on a key sequence of the structured dataset.

26. The system of claim 18, the operations further comprising retrieving one or more default values for one or more additional parameters that are not specified by the at least one metadata file, wherein defining the data rules is based on the default values of the one or more additional parameters.

27. The system of claim 18, wherein the metadata file includes one or more semantic rules that specify an interpretation of data for the structured dataset.

28. The system of claim 18, wherein the parameters of the metadata file include a data quality parameter that specifies acceptable data values for including in the structured dataset.

29. The system of claim 18, wherein the parameters of the metadata file include a data integrity parameter that specifies a key mapping scheme for the structured dataset.

30. The system of claim 18, wherein the parameters of the metadata file include a data reporting parameter that specifies whether the structured dataset of the structured dataset is configured to be read-optimized or write- optimized.

31. The system of claim 18, wherein validating that the values of the parameters and the logical rules for transforming the plurality of the data feeds are not inconsistent for each data feed includes performing a check on feed-specific metadata specifying a key surrogation rule and load-specific metadata specifying a data historization rule.

32. The system of claim 18, wherein the executable data processing application is further configured to load the transformed data into the structured dataset.

33. The system of claim 18, the operations further comprising a runtime system configurable for:
   executing, by the runtime environment, the executable application, the executing including:
      receiving the source data comprising a data feed from one or more data sources; and
      transforming the source data into the transformed data that satisfies the one or more standards; and
      loading the transformed data in compliance with the data rules into the structured dataset.

34. One or more non-transitory computer readable media storing instructions that are executable by one or more processors configured to perform operations for generating an executable data processing application to transform and load data into a structured dataset for storing data from one or more networked data sources, the operations comprising:
   receiving at least one metadata file that specifies values for parameters and logical rules for transforming data feeds, wherein each data feed is to be received from a networked data source, and loading results of transforming into a structured dataset;
   validating that the values of the parameters and logic of the logical rules for transforming the data feeds are not inconsistent for transforming each data feed;
   generating, based on the validating, data rules that specify one or more standards in accordance with the validated values of the parameters and the validated logical rules for transforming each data feed of the data feeds into a structured dataset; and
   generating, based on the generated data rules that specify the one or more standards, an executable data processing application for a runtime environment, the executable data processing application configurable to:
      receive source data comprising a data feed from one or more data sources; and
      transform the source data into transformed data that satisfies the one or more standards for the structured dataset in compliance with the generated data rules,
   wherein the source data includes a data record, and wherein a parameter of the metadata file specifies a field of the data record that represents a key value for the data record of the source data, and
   wherein a parameter of the parameters of the metadata file specifies a mapping between the field of the source data that represents the key value and a field of the structured dataset that represents a key value of the structured dataset.

* * * * *